United States Patent
Duncan et al.

(10) Patent No.: US 12,151,930 B2
(45) Date of Patent: *Nov. 26, 2024

(54) METHODS AND SYSTEMS FOR CONTROLLING FLUID FLOW TO A FLUID CONSUMING ASSET

(71) Applicant: Texas Fueling Services, Inc., Houston, TX (US)

(72) Inventors: Mason Duncan, Houston, TX (US); Hanan Tuchshnieder, Bellaire, TX (US)

(73) Assignee: Texas Fueling Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/473,975

(22) Filed: Sep. 25, 2023

(65) Prior Publication Data

US 2024/0083739 A1 Mar. 14, 2024

Related U.S. Application Data

(63) Continuation of application No. 17/088,862, filed on Nov. 4, 2020, now Pat. No. 11,767,215.

(51) Int. Cl.
| | |
|---|---|
| *B67D 7/78* | (2010.01) |
| *B67D 7/16* | (2010.01) |
| *B67D 7/30* | (2010.01) |
| *B67D 7/32* | (2010.01) |
| *B67D 7/36* | (2010.01) |

(Continued)

(52) U.S. Cl.
CPC ............... *B67D 7/78* (2013.01); *B67D 7/16* (2013.01); *B67D 7/30* (2013.01); *B67D 7/3272* (2013.01); *B67D 7/365* (2013.01); *B67D 7/38* (2013.01); *B67D 7/52* (2013.01); *B67D 7/62* (2013.01); *B67D 7/70* (2013.01); *F16K 37/0025* (2013.01)

(58) Field of Classification Search
CPC ... B67D 7/04; B67D 7/78; B67D 7/36; B67D 7/3209; B67D 7/365; B67D 7/3218
See application file for complete search history.

(56) References Cited

U.S. PATENT DOCUMENTS

| | | |
|---|---|---|
| 2,083,629 A | 6/1937 | Karla |
| 2,756,767 A | 7/1956 | Lowery |

(Continued)

OTHER PUBLICATIONS

Office Action dated Feb. 23, 2022 in U.S. Appl. No. 16/809,176.

(Continued)

*Primary Examiner* — Timothy P. Kelly
(74) *Attorney, Agent, or Firm* — Patterson + Sheridan, LLP

(57) ABSTRACT

A system for delivering a fluid to a fluid consuming asset having a fluid tank is disclosed. An inlet of a manifold is fluidically coupled to a storage tank that contains the fluid to be delivered. A first distal end of a fluid transporting mechanism is fluidically coupled to an outlet of the manifold. A second distal end of the fluid transporting mechanism is fluidically coupled to the fluid tank. A primary valve is fluidically coupled to the fluid transporting mechanism and restricts fluid flow to the fluid tank when fluid level in the fluid tank reaches a first fluid level threshold. A secondary valve is fluidically coupled to the fluid transporting mechanism and restricts fluid flow to the fluid tank when fluid level in the fluid tank reaches a second fluid level threshold. The first fluid level threshold is lower than the second fluid level threshold.

12 Claims, 14 Drawing Sheets

(51) Int. Cl.

| | | |
|---|---|---|
| *B67D 7/38* | (2010.01) | |
| *B67D 7/52* | (2010.01) | |
| *B67D 7/62* | (2010.01) | |
| *B67D 7/70* | (2010.01) | |
| *F16K 37/00* | (2006.01) | |

(56) References Cited

U.S. PATENT DOCUMENTS

| 4,244,522 | A | 1/1981 | Hartwig |
| 8,944,088 | B2 | 2/2015 | Gilmer |
| 9,856,131 | B1 | 1/2018 | Moffitt, Jr. |
| 10,017,374 | B1 | 7/2018 | Moffitt, Jr. |
| 11,767,215 | B2 | 9/2023 | Duncan et al. |
| 2008/0047606 | A1 | 2/2008 | Ross |
| 2009/0139581 | A1 | 6/2009 | Herlihy |
| 2011/0197988 | A1 | 8/2011 | Van Vliet et al. |
| 2014/0284921 | A1 | 9/2014 | van der Valk |
| 2016/0076532 | A1 | 3/2016 | Moffitt, Jr. |
| 2016/0076533 | A1 | 3/2016 | Moffitt |
| 2017/0009905 | A1 | 1/2017 | Arnold |
| 2017/0121002 | A1 | 5/2017 | Baker |
| 2017/0275149 | A1 | 9/2017 | Schmidt |
| 2017/0305736 | A1 | 10/2017 | Haile et al. |
| 2019/0337795 | A1 | 11/2019 | Shock |
| 2020/0055491 | A1 | 2/2020 | Van Wyk et al. |

OTHER PUBLICATIONS

Office Action dated Oct. 7, 2021 in U.S. Appl. No. 17/067,091.
Office Action dated Oct. 29, 2021 in U.S. Appl. No. 16/809,176.
Office Action dated Jul. 8, 2021 in U.S. Appl. No. 17/067,091.
Office Action dated Jul. 8, 2021 in U.S. Appl. No. 16/809,176.
Office Action dated Jan. 16, 2020 in U.S. Appl. No. 16/171,180.
Office Action dated Jan. 16, 2020 in U.S. Appl. No. 16/237,965.
Office Action dated Apr. 16, 2020 in U.S. Appl. No. 16/171,180.
Office Action dated Aug. 20, 2020 in U.S. Appl. No. 16/171,180.

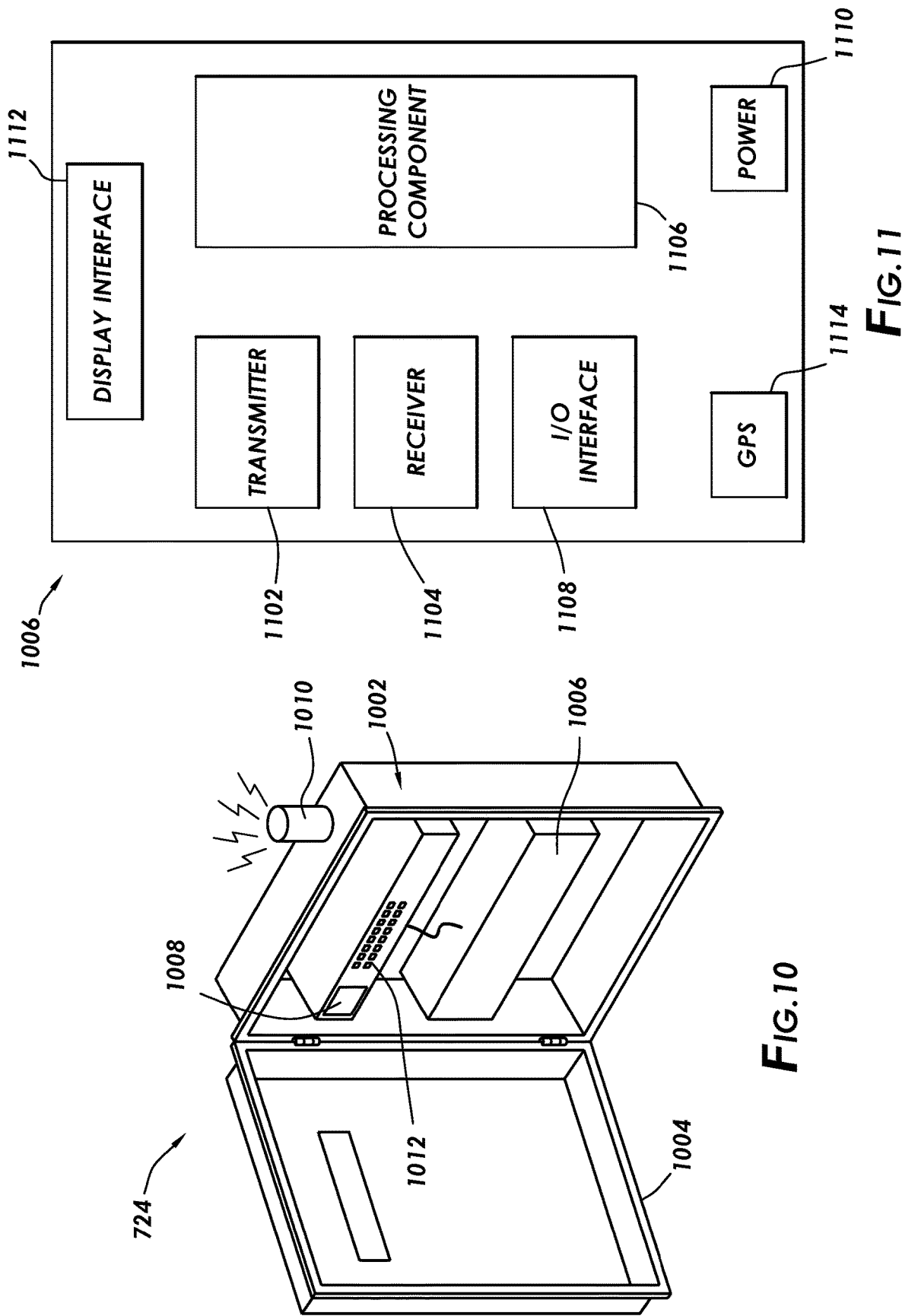

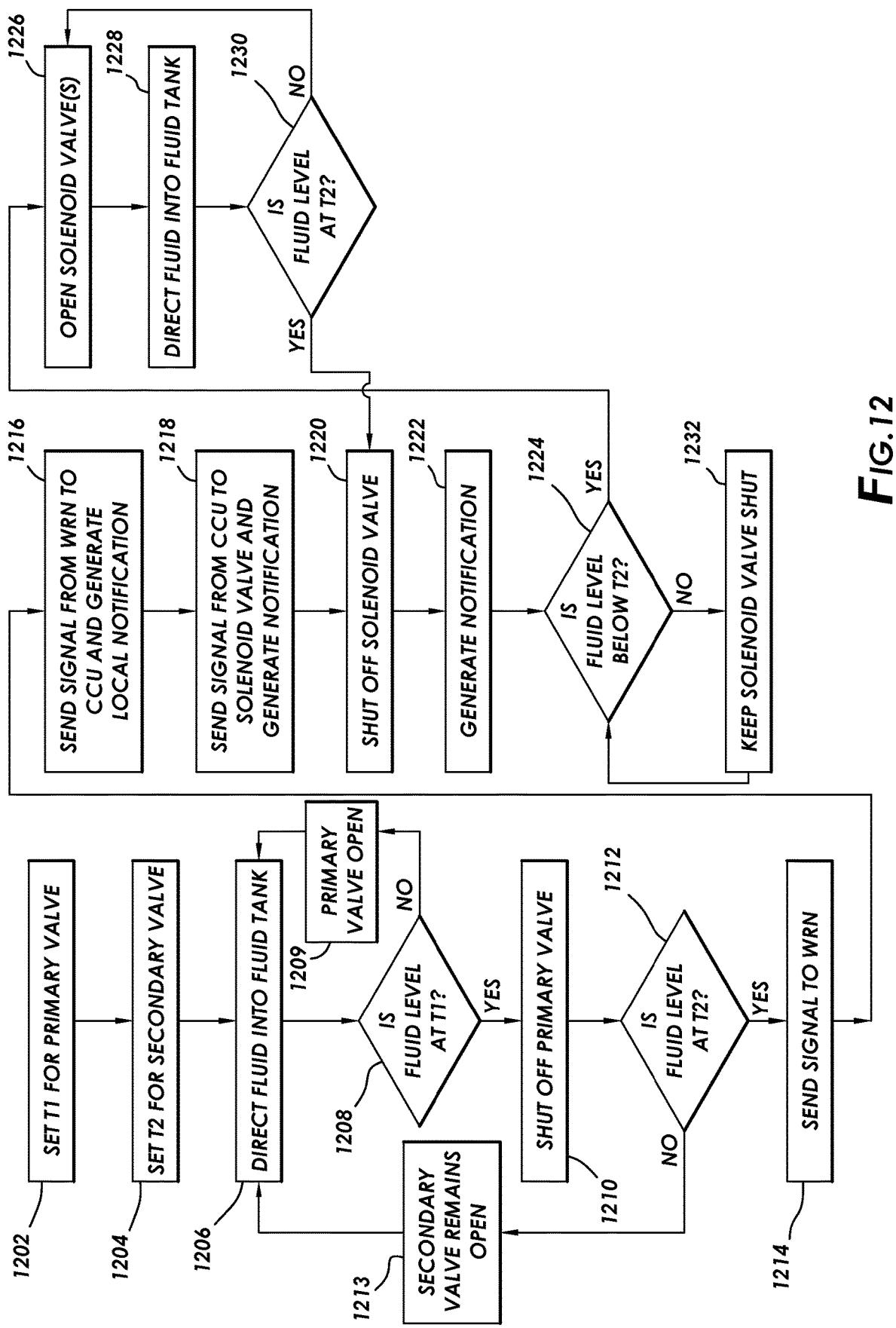

METHODS AND SYSTEMS FOR CONTROLLING FLUID FLOW TO A FLUID CONSUMING ASSET

TECHNICAL FIELD

The present invention generally relates to the field of fluid delivery to one or more fluid consuming assets, and more particularly, to a method and system for efficiently and safely monitoring and controlling fluid delivery to an asset on demand.

BACKGROUND OF THE INVENTION

In many applications, it is often desirable to deliver a fluid to a fluid consuming asset that is remotely located. Such applications include, but are not limited to, delivery of fluid for livestock management or delivery of fuel to fuel consuming assets such as, for example, equipment used when performing subterranean operations. For instance, it is often desirable to deliver fuel to one or more fuel consuming assets. The fuel consuming asset may be remotely located from the fuel source necessitating the need for transport and delivery of the fuel in a safe and efficient manner.

FIG. 1 shows a system for delivering fuel to one or more fuel consuming assets 102A, 102B, 102C in accordance with the prior art. A fuel tanker 104 carrying fuel is typically driven to a job site. One or more individuals 106 then manually deliver fuel to the fuel consuming assets 102A, 102B, 102C through a hose 108. In such prior art systems, fuel is delivered to the fuel consuming assets 102A, 102B, 102C one at a time by the individual 106 at the job site. Once the fuel consuming assets have been refueled, the fuel tanker 104 may be driven away. Each of the fuel consuming assets 102A, 102B, 102C is then continuously monitored to determine when they are running low on fuel again and the process must be repeated as needed until the work at the job site is completed.

Typical prior art fuel delivery systems have several shortcomings a non-exhaustive list of which follows. For example, manual delivery of fuel to the fuel consuming assets (one at a time) can be time consuming resulting in expenditure of valuable time and resources. Moreover, due to the manual nature of the traditional fuel delivery process which is prone to human error one or more assets may be missed in the process, especially in performance of a complex job at a job site which may involve the use of a plurality of fuel consuming assets.

Further, the prior art fuel delivery systems lack appropriate safety mechanisms and are prone to a risk of spills and leaks which are environmentally hazardous and can potentially cause fires at the job site. For example, a leak from the hose 108 can lead to fuel spillage since although shutting off a valve at the fuel tank 104 may stop fuel flow from the fuel tank 104 to the hose 108, the existing fuel in the hose 108 will continue to spill until the hose 108 is emptied. Additionally, valuable time and resources must be used to replace the hose 108 with another hose and to clean up the spilled fuel, not to mention the corresponding risk of fires at the job site. Operator error while dispensing fuel can likewise result in leaks and spills.

Additionally, depending on the nature of the job site, the manual delivery of fuel can be difficult resulting in tripping, falling or personal injury to the individual(s) delivering the fuel at the job site. The fact that personnel would have to monitor the fuel level in each fuel consuming asset throughout the refueling process in order to avoid over filling a fuel consuming asset further compounds this problem. Moreover, in instances where there are extreme weather conditions at the job site (which is not uncommon, especially in oil and gas applications) the individuals delivering the fuel who have to remain exposed to the elements during the refueling process may suffer heat exhaustion, dehydration or frost bite depending on the nature of the job site. Finally, in prior art systems, the fuel level in each of the fuel consuming assets should be continuously monitored to determine when the fuel level has reached below a threshold level and ensure fuel is delivered on a timely manner so that the fuel consuming asset does not run out of fuel.

Additionally, in certain prior art implementations fuel is pumped to a fuel consuming asset. However, at certain points during the operation, the rate at which fuel is consumed by the fuel consuming asset may be less than the rate at which fuel is delivered to the fuel consuming asset by the pump. For example, the rate at which the fuel consuming asset can receive the fuel may be less than the pump's minimum flow requirements. To address this problem, prior pumps typically included a bypass line to circulate the excess fuel back to the pump and avoid pressure build up. Specifically, any fuel delivered to the fuel consuming asset in excess of what the fuel consuming asset could receive would be recirculated back to the pump through the bypass line. However, as the fuel is recirculated through the pump to address the pressure build up the fuel heats up, ultimately damaging the pump.

One proposed solution is to use a manifold to distribute the fluid and to use mechanical valves to control fluid flow into the fluid tank of each fluid consuming asset. For instance, as shown in FIG. 2, a fluid storage tank 202 that contains the fluid to be distributed may be fluidically coupled to a manifold 204. The manifold 204 may comprise one or more outlets 206A, 206B, 206C, 206D, 206E, 206F. The number of manifold outlets depicted is for illustrative purposes only and the manifold 204 may have more or fewer outlets as desired for a given application. One or more manifold outlets (in the illustrative embodiment shown here, outlets 206A, 206B, 206C) may be fluidically coupled to a tank 208A, 208B, 208C of a corresponding fluid consuming asset 210A, 210B, 210C through a fluid transporting mechanism 212A, 212B, 212C. The fluid transporting mechanism 212A, 212B, 212C may be fluidically coupled to the tank 208A, 208B, 208C of a corresponding fluid consuming asset 210A, 210B, 210C using a mechanical valve 214A, 214B, 214C. A mechanical valve 214A, 214B, 214C is a valve mechanism that mechanically restricts fluid flow into the corresponding fluid tank 208A, 208B, 208C once the fluid level in the fluid tank reaches a predetermined threshold level. Such mechanical valves can operate without a power source as their operations are mechanically triggered by the fluid level. Such mechanical valves are disclosed for example, by the Applicants in U.S. application Ser. No. 16/171,180 and U.S. application Ser. No. 16/809,176, both of which are incorporated by reference herein. While such a system has numerous advantages over the traditional methods and systems of fluid delivery (e.g., that shown in FIG. 1), it may still have certain shortcomings.

For instance, the mechanical valve 214A, 214B, 214C may be damaged. This may result, for example, from user error during installation, wear and tear of the valve components, or other operational implications on the field. In such circumstances, with the mechanical valve 214A, 214B, 214C rendered inoperable, the tanks 208A, 208B, 208C may overfill resulting in the fluid overflowing and causing an unwanted fluid spill. Accordingly, there is a need for a back-up system to prevent such spills in the event of the failure of the mechanical valve. Moreover, it would be desirable to remotely monitor the operation of the mechanical valve, detect any failures, identify the fluid consuming asset where the failure occurred and safely and efficiently respond to such a failure to prevent a spill or minimize its impact.

There is therefore a need for a method and system to safely and efficiently deliver fluid to fluid consuming assets which addresses these and other shortcomings of existing fluid delivery systems.

SUMMARY

The present disclosure may comprise one or more of the following features and combinations thereof.

In accordance with one illustrative embodiment, the present disclosure is directed to a system for delivering a fluid to a fluid consuming asset having a fluid tank which includes a storage tank which contains the fluid to be delivered to the fluid consuming asset and a manifold having an inlet and one or more outlets. The inlet of the manifold is fluidically coupled to the storage tank and is operable to allow fluid flow from the storage tank into the manifold. A fluid transporting mechanism has a first distal end fluidically coupled to an outlet of the manifold and a second distal end fluidically coupled to the fluid tank. The fluid transporting mechanism is operable to deliver fluid from the manifold to the fluid tank. A primary valve is fluidically coupled to the fluid transporting mechanism and restricts fluid flow to the fluid tank when it is shut off. The primary valve is configured to shut off when fluid level in the fluid tank reaches a first fluid level threshold. A secondary valve is fluidically coupled to the fluid transporting mechanism wherein fluid flow to the fluid tank from the manifold is restricted if the secondary valve is shut off. The secondary valve shuts off when fluid level in the fluid tank reaches a second fluid level threshold. The first fluid level threshold is lower than the second fluid level threshold.

In accordance with another illustrative embodiment, the present disclosure is directed to a system for delivering a fluid to a fluid consuming asset having a fluid tank which includes a manifold having an inlet and one or more outlets. The inlet of the manifold is fluidically coupled to a storage tank and is operable to allow fluid flow from the storage tank into the manifold. A fluid transporting mechanism has a first distal end fluidically coupled to an outlet of the manifold and a second distal end fluidically coupled to a mechanical valve disposed within the fluid tank. The fluid transporting mechanism is operable to deliver fluid from the manifold to the fluid tank. An electric valve is fluidically coupled to the fluid transporting mechanism between the first distal end and the second distal end. The electric valve is operable to shut off fluid flow through the fluid transporting mechanism to the fluid tank. An electric probe is disposed inside the fluid tank, the electric probe comprising a seat, a contact, and a float disposed between the seat and the contact. The float is movable between a first position where the float rests on the seat and a second position where the float connects to the contact. A probe control line communicatively couples the electric probe and the electric valve. When the float is in the second position the probe control line communicates a signal from the electric probe to the electric valve. The electric valve is operable to shut off when it receives the signal.

Further, in accordance with certain illustrative embodiments, the present disclosure discloses a method of delivering fluid from a storage tank to a fluid consuming asset. The fluid is directed from the storage tank to an inlet of a manifold, the manifold having a plurality of outlets. The fluid is then directed from an outlet of the manifold to a fluid transporting mechanism which is fluidically coupled to an electric valve. The fluid is then directed from the fluid transporting mechanism to a mechanical valve disposed inside the fluid tank. The mechanical valve is shut off when level of fluid in the fluid tank reaches a first fluid level threshold and the electric valve is shut off when level of fluid in the fluid tank reaches a second fluid level threshold. The first fluid level threshold is lower than the second fluid level threshold.

In accordance with another illustrative embodiment, the present disclosure is directed to a system for delivering a fluid to a fluid consuming asset having a fluid tank which includes a storage tank which contains the fluid to be delivered to the fluid consuming asset and a manifold having an inlet and one or more outlets. The inlet of the manifold is fluidically coupled to the storage tank and is operable to allow fluid flow from the storage tank into the manifold. A fluid transporting mechanism has a first distal end fluidically coupled to an outlet of the manifold and a second distal end fluidically coupled to the fluid tank. The fluid transporting mechanism is operable to deliver fluid from the manifold to the fluid tank. A mechanical valve is disposed in the fluid tank and is fluidically coupled to the fluid transporting mechanism. The mechanical valve is operable to restrict fluid flow to the fluid tank from the manifold when the mechanical valve is shut off. The mechanical valve is configured to shut off when fluid level in the fluid tank reaches a first fluid level threshold. A first electric valve is fluidically coupled to the inlet of the manifold. The first electric valve is configured to restrict fluid flow to the manifold inlet when it is shut off. A second electric valve is fluidically coupled to the fluid transporting mechanism and disposed between the manifold and the fluid tank. The second electric valve is configured to restrict fluid flow through the fluid transporting mechanism to the fluid tank when it is shut off. A Wireless Relay Node is provided corresponding to the fluid tank. The Wireless Relay Node receives a first signal when fluid level in the fluid tank has reached a second fluid level threshold. The first fluid level threshold is lower than the second fluid level threshold. The Wireless Relay Node is configured to send a second signal to selectively shut off at least one of the first electric valve and the second electric valve after it receives the first signal.

In accordance with another illustrative embodiment, the present disclosure is directed to a system for delivering a fluid to a fluid consuming asset having a fluid tank which includes a storage tank which contains the fluid to be delivered to the fluid consuming asset and a manifold having an inlet and one or more outlets. The inlet of the manifold is fluidically coupled to the storage tank and is operable to allow fluid flow from the storage tank into the manifold. A fluid transporting mechanism has a first distal end fluidically coupled to an outlet of the manifold and a second distal end fluidically coupled to the fluid tank. The fluid transporting mechanism is operable to deliver fluid from the manifold to the fluid tank. A mechanical valve is disposed in the fluid tank and is fluidically coupled to the fluid transporting mechanism. The mechanical valve is operable to restrict fluid flow to the fluid tank from the manifold when the mechanical valve is shut off. The mechanical valve is configured to shut off when fluid level in the fluid tank reaches a first fluid level threshold. A mainline electric valve fluidically coupled to the inlet of the manifold and is configured to restrict fluid flow to the manifold inlet when it is shut off. A Wireless Relay Node is provided corresponding to the fluid tank. The Wireless Relay Node receives a first signal when fluid level in the fluid tank has reached a second fluid level threshold. The first fluid level threshold is lower than the second fluid level threshold. The Wireless Relay Node is configured to send a second signal to shut off the mainline electric valve after it receives the first signal.

In accordance with another illustrative embodiment, the present disclosure is directed to a system for delivering a fluid to a fluid consuming asset having a fluid tank which includes a storage tank which contains the fluid to be delivered to the fluid consuming asset and a manifold having an inlet and one or more outlets. The inlet of the manifold is fluidically coupled to the storage tank and is operable to allow fluid flow from the storage tank into the manifold. A fluid transporting mechanism has a first distal end fluidically coupled to an outlet of the manifold and a second distal end fluidically coupled to the fluid tank. The fluid transporting mechanism is operable to deliver fluid from the manifold to the fluid tank. A mechanical valve is disposed in the fluid tank and is fluidically coupled to the fluid transporting mechanism. The mechanical valve is operable to restrict fluid flow to the fluid tank from the manifold when the mechanical valve is shut off. The mechanical valve is configured to shut off when fluid level in the fluid tank reaches a first fluid level threshold. A distribution electric valve is fluidically coupled to the fluid transporting mechanism and disposed between the manifold and the fluid tank and is configured to restrict fluid flow through the fluid transporting mechanism to the fluid tank when it is shut off. A Wireless Relay Node is provided corresponding to the fluid tank. The Wireless Relay Node receives a first signal when fluid level in the fluid tank has reached a second fluid level threshold. The first fluid level threshold is lower than the second fluid level threshold. The Wireless Relay Node is configured to send a second signal to shut off the distribution electric valve after it receives the first signal.

The objects, advantages and other features of the present invention will become more apparent upon reading of the following non-restrictive description of a preferred embodiment thereof, given by way of example only with reference to the accompanying drawings. Although various features are disclosed in relation to specific exemplary embodiments of the invention, it is understood that the various features may be combined with each other, or used alone, with any of the various exemplary embodiments of the invention without departing from the scope of the invention.

BRIEF DESCRIPTION OF THE DRAWINGS

For a more complete understanding of the present invention and its features and advantages, reference is now made to the following description, taken in conjunction with the accompanying drawings, in which:

FIG. 10 is a perspective view of an illustrative embodiment of the Central Control Unit of FIG. 7 in accordance with an illustrative embodiment of the present disclosure;

FIG. 11 is a block diagram of a Central Control Unit Circuitry in accordance with an illustrative embodiment of the present disclosure;

FIG. 12 depicts an illustrative example of method steps performed using the system of FIG. 7 in accordance with a first exemplary embodiment of the present disclosure;

Figure 1:
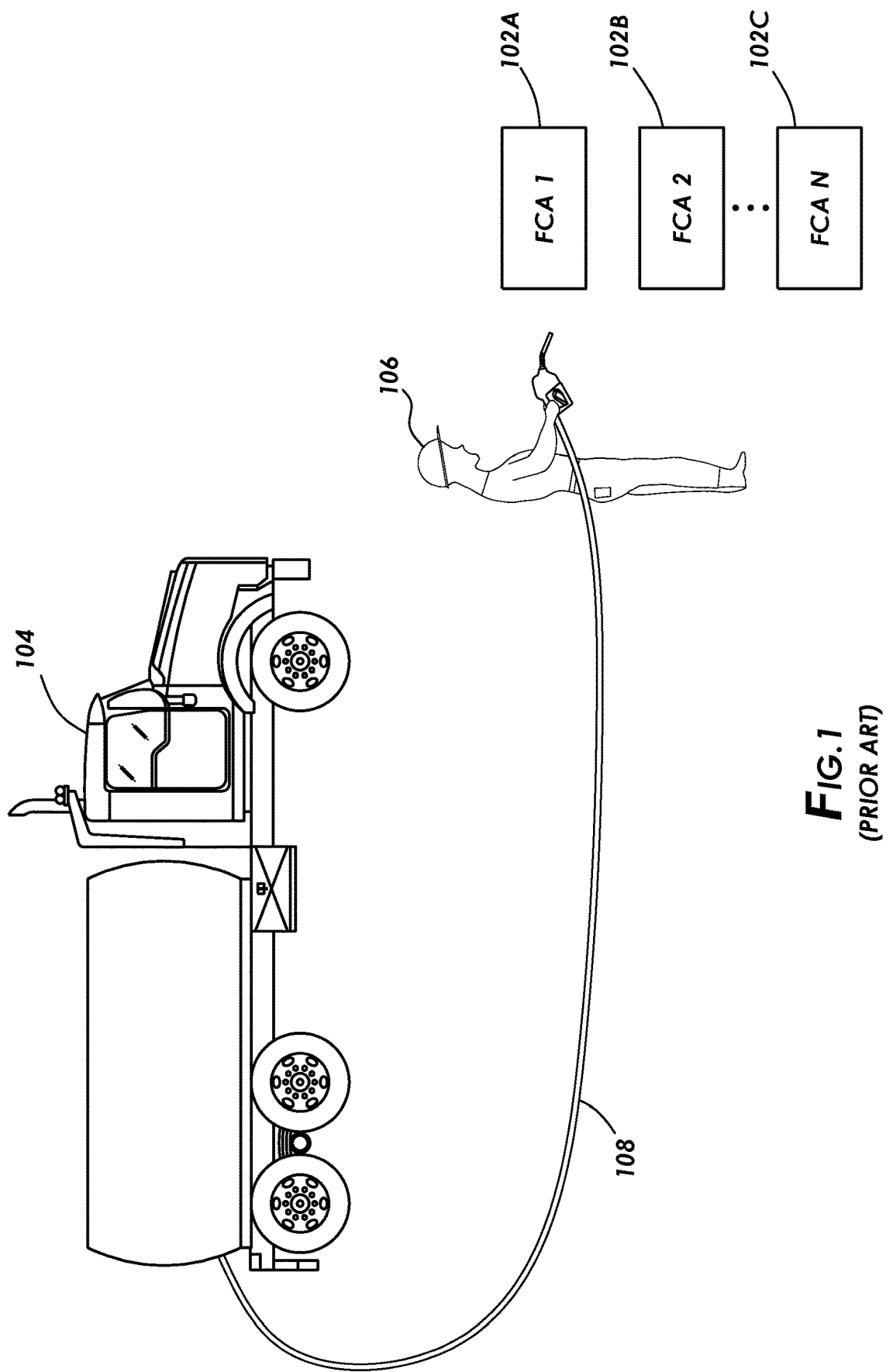
FIG. 1 is a first system for delivering fluid to one or more fluid consuming assets in accordance with the prior art.

While embodiments of this disclosure have been depicted and described and are defined by reference to example embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are illustrative examples only, and not exhaustive of the scope of the disclosure.

DESCRIPTION OF ILLUSTRATIVE EMBODIMENT(S)

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

As used herein, the terms "coupled" or "couple" include both a direct connection and an indirect connection between components. Similarly, the term "fluidically coupled" includes both a direct connection allowing fluid flow between two components as well as an indirect connection allowing fluid flow between two components. Likewise, the term "communicatively coupled" includes both a direct connection allowing communication of information between two components as well as an indirect connection allowing communication of information between two components through other components. Moreover, two components may be "communicatively coupled" to each other through a wired or a wireless connection. Further, in the figures and the description, like numerals are intended to represent like elements.

As used herein, the term "fluid consuming asset" includes any equipment or component of a system that consumes fluid and may need to be supplied with fluid on location in order to meet system requirements. For instance, in certain illustrative embodiments, the fluid being delivered may be water and the fluid consuming asset may be containers that hold the water for use by livestock. In other illustrative embodiments, the fluid may be "fuel" and the "fluid consuming asset" may be a "fuel consuming asset" which may include any equipment or component of a system that consumes fuel and may need refueling on location. For example, the term "fuel consuming asset" includes any fuel consuming equipment having a fuel tank that is too small to hold sufficient fuel to complete the task at hand before refueling is required. The term "fuel consuming asset" further includes any fuel consuming equipment that needs to refuel "on-location" because, for example, it is remotely located or moving it to a fuel source to refuel is expensive, time consuming and/or otherwise inefficient. In one embodiment, the fuel consuming asset may be equipment used in performance of subterranean operations such as, for example, oilfield applications. Such applications may include, for example, equipment used in construction or development of oil and gas fields. The term "fuel consuming asset" may include a number of other equipment including, for example, irrigation pumps, emergency response generators, construction equipment, or any oilfield services equipment (e.g., fracturing equipment, etc.).

In one or more exemplary embodiments there is disclosed herein a new and improved fueling on-demand system with fluid flow control redundancy and associated methods used to deliver fluid to a fluid consuming asset.

Figure 3:
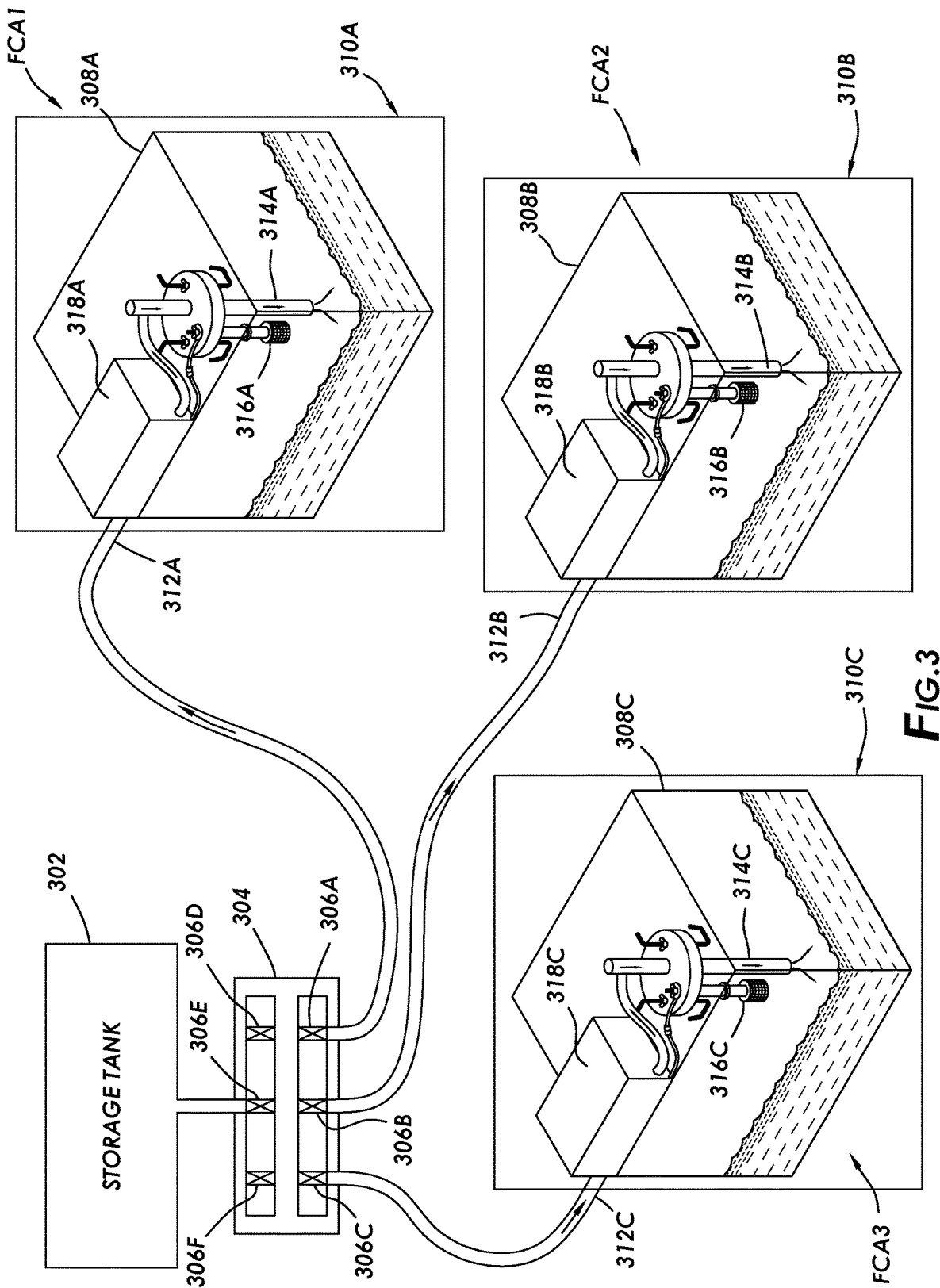
FIG. 3 is a system for delivering fluid to one or more fluid consuming assets in accordance with an illustrative embodiment of the present disclosure.

FIG. 3 depicts a system for delivering fluid to one or more fluid consuming assets on-demand while providing a back-up system to the mechanical valve in accordance with an illustrative embodiment of the present disclosure. Specifically, in the illustrative embodiment of FIG. 3, a fluid storage tank 302 is fluidically coupled to a manifold 304 having a plurality of outlets 306A, 306B, 306C, 306D, 306E, 306F. The outlets 306A, 306B, 306C are each fluidically coupled to and deliver fluid to a fluid tank 308A, 308B, 308C of a corresponding fluid consuming asset 310A, 310B, 310C. The number of outlets 306 and fluid consuming assets 310 is depicted for illustrative purposes only and there may be fewer or more outlets 306 or fluid consuming assets 310 utilized without departing from the scope of the present disclosure. Moreover, although a single fluid tank 308 is depicted for each fluid consuming asset 310, the present disclosure is not limited to this particular configuration and as would be appreciated by those of ordinary skill in the art a single fluid consuming asset 310 may use more than one fluid tank 308.

Figure 2:
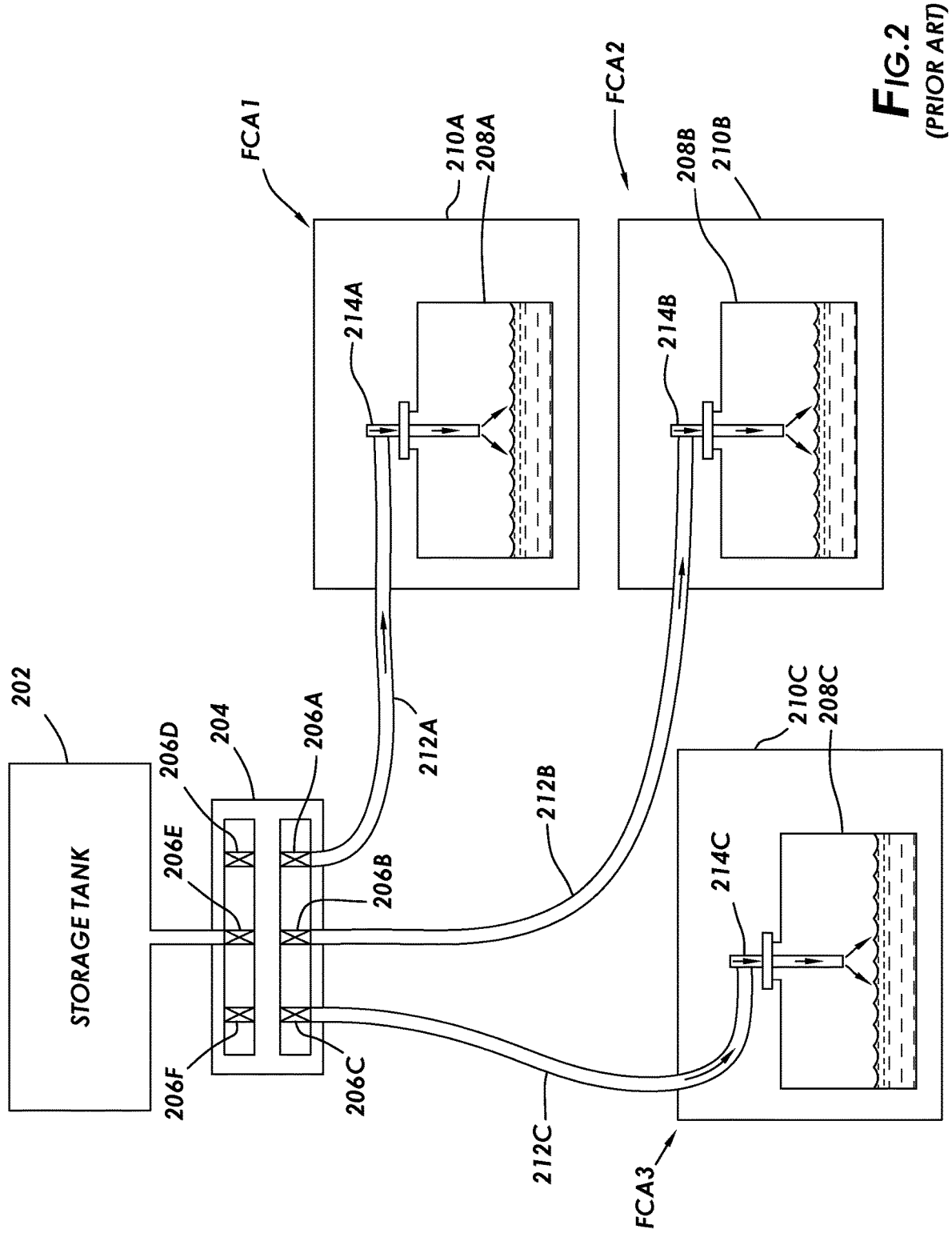
FIG. 2 is a second system for delivering fluid to one or more fluid consuming assets in accordance with the prior art.

Like the fluid tanks 208 of FIG. 2, each of the fluid tanks 308A, 308B, 308C receives fluid from a corresponding manifold outlet 306A, 306B, 306C through a fluid transporting mechanism 312A, 312B, 312C. Additionally, each fluid tank 308A, 308B, 308C includes a corresponding mechanical valve 314A, 314B, 314C. The mechanical valve 314A, 314B, 314C may be any valve mechanism that operates mechanically to restrict fluid flow into the fluid tank 308A, 308B, 308C once the level of fluid therein exceeds a preset threshold. Specifically, the mechanical valve is configured to shut off and restrict fluid flow into the fluid tank 308A, 308B, 308C once the level of fluid therein reaches a preset threshold. Such mechanical valves are disclosed for example, by the Applicants in U.S. application Ser. No. 16/171,180 and U.S. application Ser. No. 16/809,176, both of which are incorporated by reference herein.

The improved fluid delivery mechanism of the present disclosure is directed to a dual valve system wherein a secondary valve provides redundancy in the event of the failure of the primary valve. Specifically, as discussed in further detail in conjunction with FIGS. 4 and 5, in addition to the mechanical valve 314A, 314B, 314C, the improved fluid delivery mechanism of the present disclosure includes an electric valve 410 that serves as a back-up valve to regulate fluid flow in the event of the failure of the mechanical valve 314A, 314B, 314C. In the illustrative embodiment of FIG. 3, the electric valve 410 is disposed in the control box 318A, 318B, 318C and may be electrically triggered by the float 316A, 316B, 316C. The structure and operation of the electric valve is now discussed in further detail in conjunction with FIGS. 4A-4C.

Figure 4A:
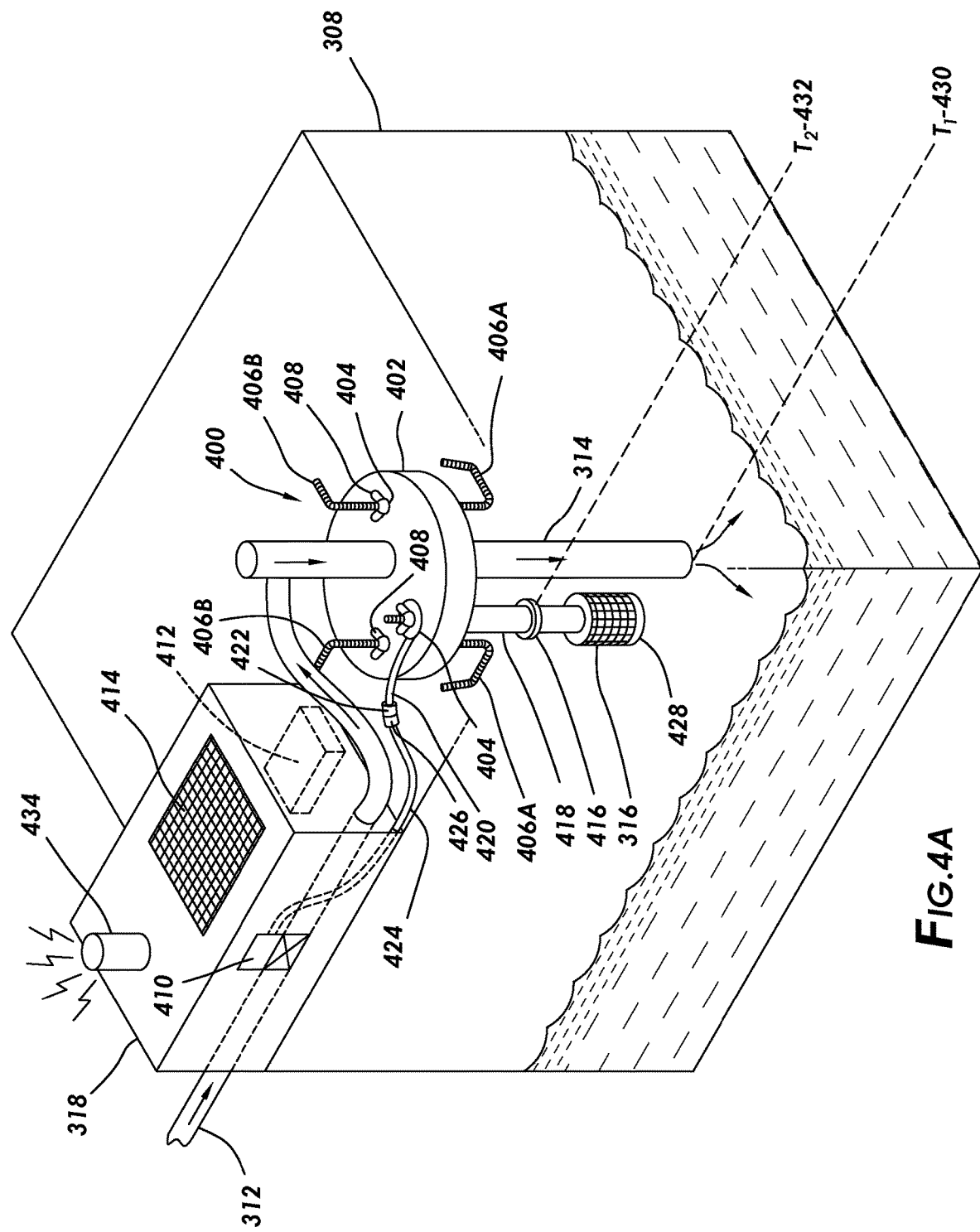
FIG. 4A is a close up view of a fluid tank of FIG. 3 with the fluid level below the fluid level threshold of the primary valve.
Figure 4B:
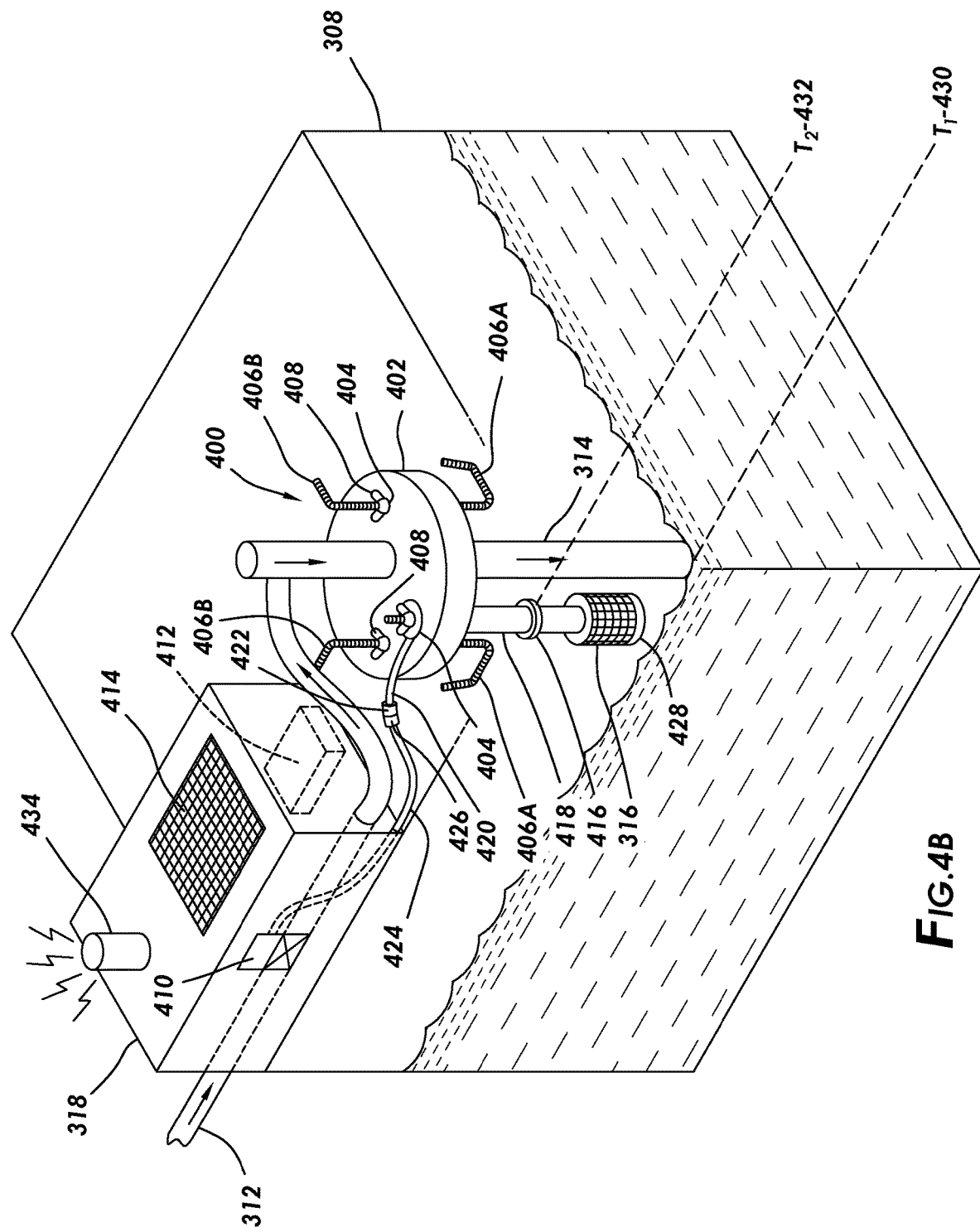
FIG. 4B is a close up view of a fluid tank of FIG. 3 with the fluid level at the fluid level threshold of the primary valve.
Figure 4C:
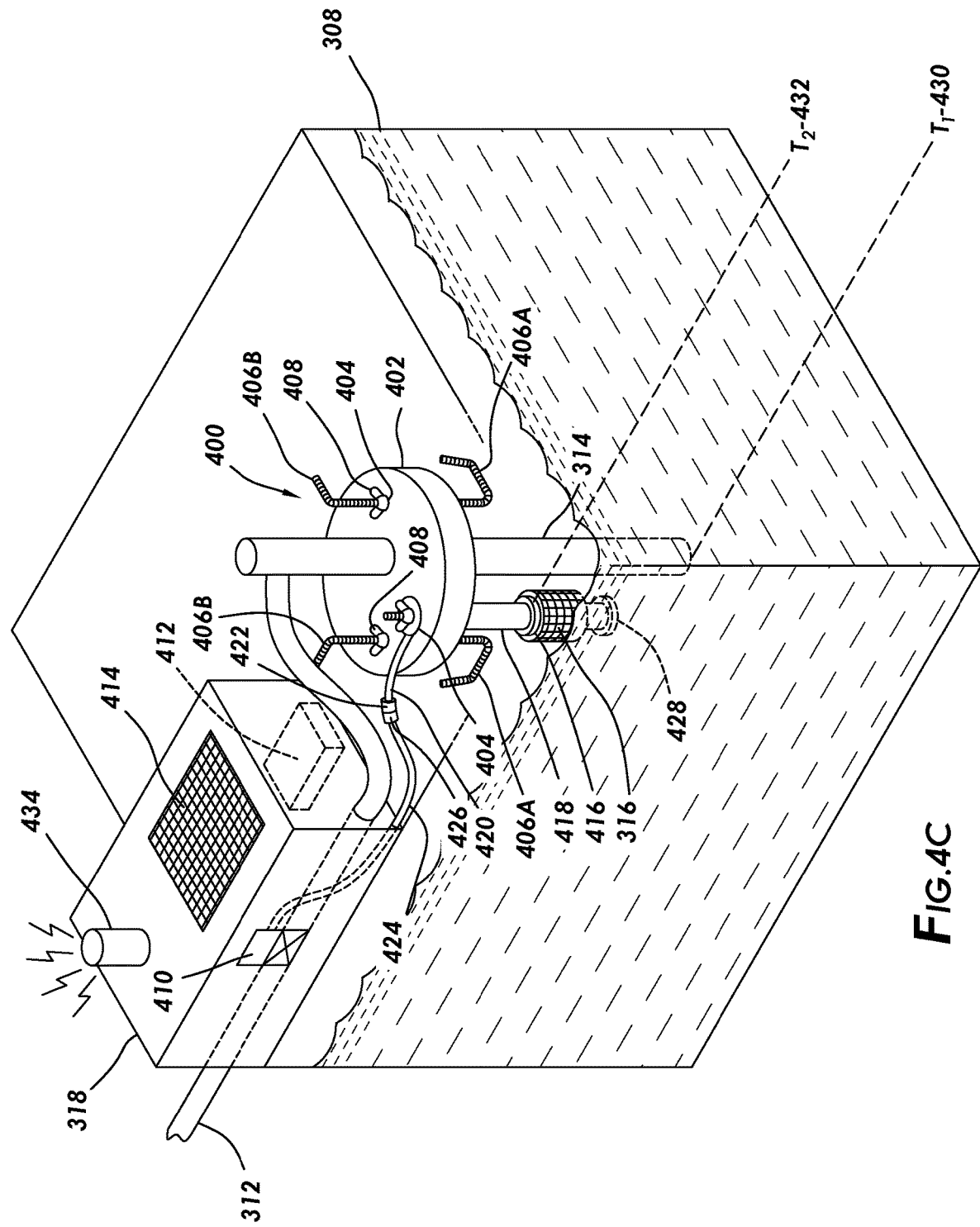
FIG. 4C is a close up view of a fluid tank of FIG. 3 with the fluid level at the fluid level threshold of the secondary valve.

FIG. 4A is a close-up view of an illustrative improved fluid delivery system of the present disclosure with the primary valve and the secondary valve both open and the fluid level below the threshold level of the primary valve. FIG. 4B is a close-up view of the illustrative improved fluid delivery system of the present disclosure with the level of fluid at the threshold level of the primary valve where the primary valve has not failed and accordingly, the primary valve is closed preventing fluid flow while the secondary valve remains open. FIG. 4C is a close-up view of the illustrative improved fluid delivery system of the present disclosure with the level of fluid at the threshold level of the secondary valve where the primary valve has failed and the secondary valve is closed to prevent fluid flow into the tank. These embodiments will now be discussed in further detail below.

As shown in FIG. 4A, the mechanical valve 314 may be coupled to a fill cap 400 and disposed in the fluid tank 308. The fill cap 400 may be any suitable fill cap used to couple the primary valve to the fluid tank 308. In certain illustrative embodiments, the fill cap 400 includes a connection plate 402 that rests on the opening of the fluid tank 308 and may be used to couple the fill cap 400 to the fluid tank 308. The connection plate 402 may be made from any suitable materials for the particular application including, but not limited to, aluminum, wood, steel, plexiglass, or any synthetic material deemed suitable for the particular implementation. In certain implementations, the use of clear materials (e.g., plexiglass) may be beneficial as it allows for visual inspection of fluid delivery and fluid levels within a fluid tank 308 of a fluid consuming asset 310. In one illustrative embodiment, the connection plate 402 includes two openings 404. A connecting member 406 may be inserted through each opening 404. In one embodiment, the connecting member 406 may be a "J" shaped or a "C" shaped connecting member. In certain implementations, it is advantageous to use a "C" shaped connecting member 406 so that the user can determine the location of the inner lip 406A of the connecting member 406 disposed within the fluid tank 308 based on the location of the outer lip 406B of the connecting member 406 which is disposed outside the fluid tank 308 and is therefore visually accessible and can be observed by the operator.

The connecting member 406 may be made of any suitable material for the desired application including, but not limited to, steel, plastic, or stainless steel. In certain embodiments, all or part of the connecting member 406 may be threaded. Once the connecting member 406 is inserted through the opening 404 on the connection plate 402, a fastener 408 may be used to fasten the connecting member 406 such that it couples the connection plate 402 to the opening of the fluid tank 308. Specifically, in one embodiment, the fastener 408 may be a nut that is coupled to threads on the connecting member 406. Any suitable nut may be used as the fastener 408. For instance, in certain embodiments, the fastener 408 may be a wing nut. As the fastener 408 is tightened on the connecting member 406, the connecting member 406 moves upwards (i.e., the inner lip 406A moves towards the connection plate 402) through the opening 404 in the connection plate 402 until it has moved enough for the inner lip 406A of the connecting member 406 disposed within the fluid tank 308 to rest against the wall of the fluid tank 308 as shown in FIG. 4A. At this point, the connecting member 406 holds the fill cap 400 in place against the fluid tank 308 while the fluid delivery operations are performed. As would be appreciated by those of ordinary skill in the art, having the benefit of the present disclosure, while two connecting members 406 are depicted in the illustrative embodiment, the connection plate 402 may have more than two openings to allow more than two connecting members 406 to be used if desired.

As shown in FIG. 4A, the fluid transporting mechanism 312 directs the fluid through a control box 318 to the mechanical valve 314. Although the control box 318 is depicted as being disposed on the fluid tank 308 in the illustrative embodiment of FIGS. 3 and 4, the present disclosure is not limited to this particular configuration. For instance, if desirable, in other illustrative embodiments the control box 318 may be disposed in a location separate from the fluid tank 308 without departing from the scope of the present disclosure. Moreover, as would be appreciated by those of ordinary skill in the art, having the benefit of the present disclosure, the methods and systems disclosed herein may be implemented without using a control box 318 by instead placing the components of the control box 318 directly on the fluid tank 308 or proximate thereto. However, the use of the control box 318 is beneficial as it prevents the system components' exposure to the elements and protects them.

The control box 318 includes an electric valve 410. The term "electric valve" as used herein refers to any suitable valve that is operable to restrict fluid flow in response to receiving an electric signal. In certain illustrative embodiments, the electric valve 410 may be a solenoid valve. Although the present disclosure may at times focus and/or refer to the solenoid valve 410 as the electric valve, as would be appreciated by those of ordinary skill in the art, having the benefit of the present disclosure, the present disclosure is not intended to be limited as such.

The solenoid valve 410 is disposed within the fluid path from the fluid transporting mechanism 312 to the mechanical valve 314. Stated otherwise, the electric valve 410 is fluidically coupled to the fluid transporting mechanism 312 such that fluid flow through the fluid transporting mechanism 312 is restricted when the electric valve 410 is shut off. As would be appreciated by those of ordinary skill in the art, having the benefit of the present disclosure, a solenoid valve is an electro-mechanical valve that is operable to selectively shut off or allow fluid flow depending on whether it is electrically energized or de-energized. The structure and operation of a solenoid valve 410 is well known to those of ordinary skill in the art, having the benefit of the present disclosure and therefore, it will not be discussed in detail herein. In other illustrative embodiments, the electric valve may be any other type of valve that can selectively shut off and restrict fluid flow based on a received signal. Accordingly, the solenoid valve 410 may be replaced with any other suitable electric valve without departing from the scope of the present disclosure.

In certain illustrative embodiments, the solenoid valve 410 may be powered by a power source. Specifically, the power source may supply the power needed to allow the solenoid valve 410 to operate. In certain illustrative embodiments, the power source may be a battery 412. As would be appreciated by those of ordinary skill in the art, having the benefit of the present disclosure, the battery 412 may be any suitable battery for the particular application. For instance, the battery 412 may be one that is easily rechargeable and replaceable in order to facilitate efficient operations. In addition to the battery 412 (or if appropriate, in lieu thereof), the control box 318 may include a solar cell 414. In certain illustrative embodiments, the solar cell 414 may be used to supply power directly to the solenoid valve 410, obviating the need for a battery 412. In other embodiments, the solar cell 414 may be utilized in conjunction with the battery 412 to, for example, supply power to charge the battery 412 and/or provide a back-up source of power in instances when the battery 412 is out of charge or malfunctions. The structure and operation of a solar cell 414 are well known to those of ordinary skill in the art, having the benefit of the present disclosure and therefore, will not be discussed in detail herein. As would be appreciated by those of ordinary skill in the art, any suitable combination of battery and solar cell may be used for a particular application without departing from the scope of the present disclosure. Alternative, the solenoid valve 410 may be directly connected to a power outlet (not shown) if appropriate for the particular implementation.

In certain illustrative embodiments, the solenoid valve 410 may be communicatively coupled to an electric probe 418. For instance, the solenoid valve 410 may be communicatively coupled to a contact 416 on the electric probe 418 disposed within the fluid tank 308. In one illustrative embodiment, a probe control line 420 extends from the electric probe 418 and includes a first connector 422. Similarly, a solenoid valve control line 424 extends from the solenoid valve 410 and includes a second connector 426. The first connector 422 and the second connector 426 may be detachably coupled to provide a line for transmission of signals from the contact 416 to the solenoid valve 410. The use of a detachable connection using the first connector 422 and the second connector 426 may be beneficial as it simplifies the installation of the system components. Moreover, because the solenoid valve 410 is detachably coupled to the electric probe 418, in the event of a defect, wear and tear, or other malfunction the system components may be easily replaced and repaired without the need to disassemble the entire system. However, the present disclosure is not limited to this particular configuration and in certain illustrative embodiments the probe control line 420 may be directly connected to the solenoid valve 410 acting as a continues control line that communicatively couples the solenoid valve 410 and the electric probe 418.

The electric probe 418 is disposed inside the fluid tank 308 with a float 316 that is movable between the contact 416 and a seat 428. The float 316 may be made of any suitable material with the appropriate buoyancy for the particular fluid in the fluid tank. Specifically, the float 316 may be made from any suitable material that would float on the particular fluid used in a given implementation such that a change in the fluid level could result in the movement of the float 316. When the float 316 touches the contact 416 it closes a circuit and sends a signal to the solenoid valve 410 through the probe control line 420 and the solenoid valve control line 424 resulting in the solenoid valve 410 closing and preventing fluid flow from the fluid transporting mechanism 312 through the control box 318 and to the mechanical valve 314. This is discussed further below in conjunction with FIG. 4C.

Figure 5:
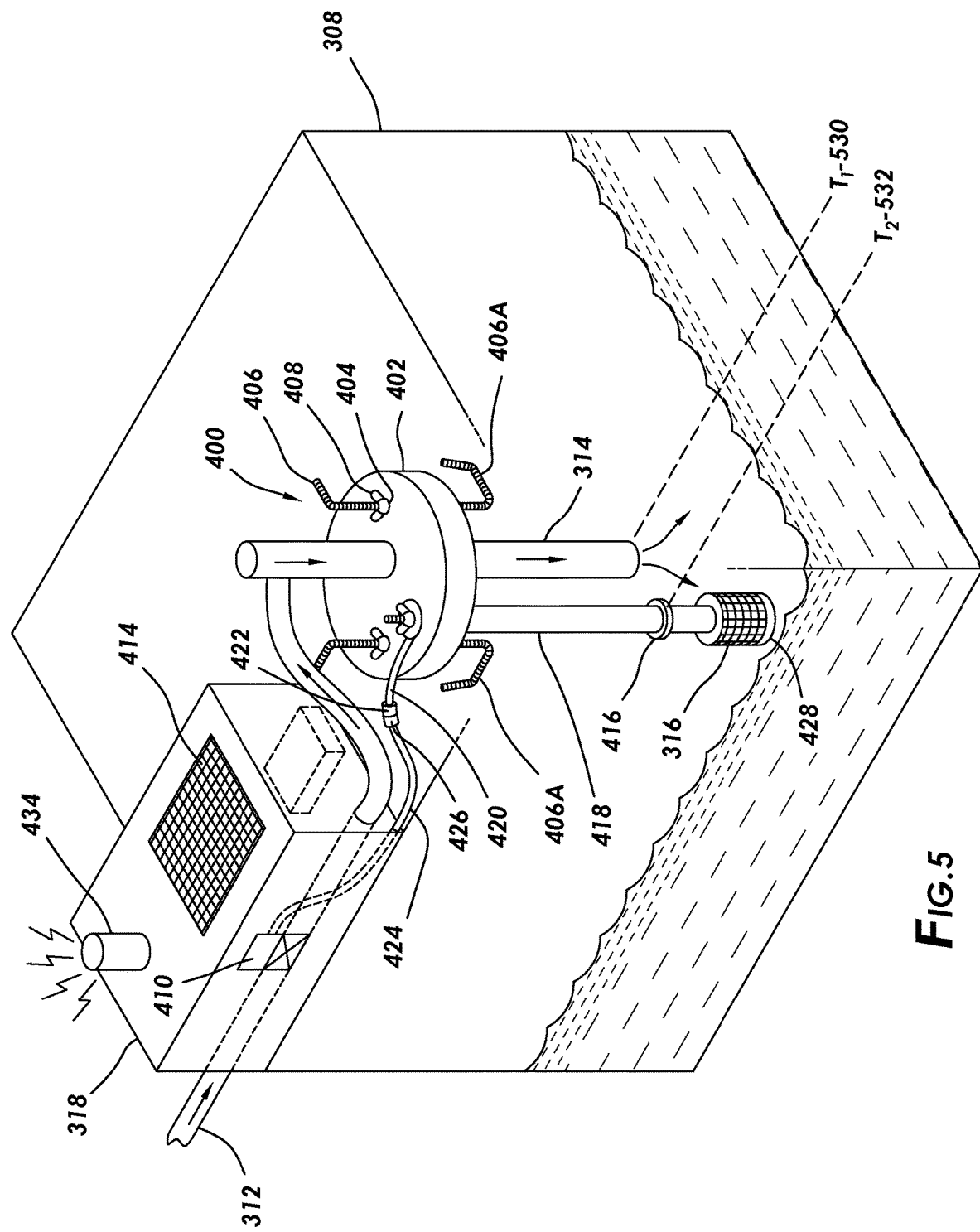
FIG. 5 is a close up view of a fluid tank in accordance with another illustrative embodiment of the present disclosure with the fluid level below the fluid level threshold of the primary valve.

In the illustrative embodiment of FIGS. 3 and 4, the length of the electric probe 418 is less than the length of the mechanical valve 314 and the fluid level threshold for shutting off the electric valve (e.g., solenoid valve 410) is higher than the fluid level threshold for shutting of the mechanical valve 314. With this configuration, the mechanical valve 314 operates as the primary valve regulating fluid flow into the fluid tank 308 and the solenoid valve 410 operates as the secondary valve or the "back-up" valve which only operates if the primary valve has failed. This configuration is beneficial because, for instance, the mechanical valve 314 does not require a power source while the solenoid valve 410 does and therefore, power consumption may be minimized by using the solenoid valve 410 as the secondary or back-up valve. However, as would be appreciated by those of ordinary skill in the art, having the benefit of the present disclosure, the present disclosure is not limited to this particular configuration. For instance, the electric probe 418 may be configured to have a length that exceeds the length of the mechanical valve 314 such that the float 316 touches the contact 416 before the mechanical valve is activated as shown in FIG. 5. In this configuration, the electric valve in the control box 318 (for example, the solenoid valve 410 of the illustrative embodiment) acts as the primary valve and the mechanical valve 314 acts as the secondary or back-up valve. As would be appreciated by those of ordinary skill in the art, having the benefit of the present disclosure, the embodiment of FIG. 5 would operate in the same manner as that of FIGS. 3 and 4 except for the fact that the roles of the mechanical valve 314 and the electric valve (e.g., solenoid valve 410) are reversed. Accordingly, the details of operation of the system will be discussed in conjunction with the embodiment of FIGS. 3 and 4 even though the same redundancy may be provided using the embodiment of FIG. 5 (albeit, by reversing the role of the mechanical valve 314 and the electric valve (e.g., solenoid valve 410) without departing from the scope of the present disclosure.

Stated otherwise, the mechanical valve 314 may have a first fluid level threshold and the electric valve (e.g., solenoid valve 410) may have a second fluid level threshold. With respect to each fluid valve, the term "fluid level threshold" as used herein refers to the level of fluid in the fluid tank 308 that would result in closure of that valve. In the illustrative embodiment of FIGS. 3-5, a first fluid level threshold (T1) is shown for the mechanical valve that coincides with the lower most end of that valve and a second fluid level threshold (T2) is shown for the electric valve that coincides with the contact 416 of that valve. As would be appreciated by those of ordinary skill in the art, having the benefit of the present disclosure, the specific location of the fluid level threshold designated as T1/T2 may be altered without departing from the scope of the present disclosure. Specifically, the levels T1 430/530 and T2 (434/532) are shown for illustrative purposes only and depending on the type of valve used may not necessarily coincide with the lowest point of the mechanical valve 314 and the contact 416 as shown in the figures. For instance, in certain implementations, the first fluid level threshold (T1) may be lower or higher than the lower most end of the mechanical valve without departing from the scope of the present disclosure. That may be the case depending on the particular mechanical valve implementation used such as, for example, the mechanical valves disclosed by the Applicants in U.S. application Ser. No. 16/171,180 and U.S. application Ser. No. 16/809,176. Similarly, in certain embodiments, the second fluid level threshold (T2) may be lower or higher than the location of the contact (416) without departing from the scope of the present disclosure. For instance, the second fluid level threshold (T2) may coincide with the lower end of the float 316.

In accordance with another illustrative embodiment of the present disclosure (not shown), both the primary valve and the secondary valve may be electric valves. Specifically, two different electric valves having different fluid level thresholds may be used in a manner similar to that of the embodiment of FIGS. 3-5 with one serving as the primary valve and the other as the secondary valve.

Returning now to the embodiment of FIGS. 3 and 4, the first fluid level threshold (T1 430) is lower than the second fluid level threshold (T2 432). Accordingly, in this configuration the mechanical valve 314 serves as the primary valve while the electric valve (e.g., solenoid valve 410) serves as the secondary or back-up valve. In contrast, in the embodiment of FIG. 5, the first fluid level threshold (T1 530) is higher than the second fluid level threshold (T2 532). Accordingly, in that configuration the electric valve (e.g., solenoid valve 410) serves as the primary valve while the mechanical valve 314 serves as the secondary or back-up valve.

Returning now to FIG. 4A, the figure shows the system with the level of fluid in the fluid tank 308 below the threshold set for the mechanical valve 314 (i.e., T1-430). With the fluid level below T1 430, the mechanical valve 314 remains open. Additionally, because the fluid level T2 432 is not reached, the solenoid valve 410 likewise remains open. With both valves open, fluid flows into the tank 308 from the fluid transporting mechanism 312. Fluid flow continues until as shown in FIG. 4B, the level of fluid in the tank 308 reaches T1 430, the threshold level for the mechanical valve 314.

Once the level of fluid in the tank 308 reaches T1 430, the mechanical valve 314 shuts off and prevents fluid flow into the tank 308 until the fluid is used up and the level of fluid goes below T1 430. However, in the event of a failure of the mechanical valve 314, the fluid level would continue to rise leading to a potential spill in prior art systems. Such spills are prevented using the methods and systems disclosed herein by using the electric valve as discussed in conjunction with FIG. 4C.

With the mechanical valve 314 failing to prevent fluid flow into the tank 308, the level of fluid in the tank 308 continues to rise. However, once the fluid level reaches the float 316 the float 316 will rise along the electric probe 318 from the seat 428 until the top of the float 316 connects to the contact 416 with the fluid level at T2 432 as shown in FIG. 4C. Accordingly, the float 316 is movable between a first position where it rests on the seat 428 and a second position where it connects to the contact 416. Once the float 316 touches or connects to the contact 416, a signal is transmitted from the electric probe 418 through the probe control line 420 and the solenoid valve control line 424 to the solenoid valve 410 causing the solenoid valve 410 to close. With the solenoid valve 410 in the closed position, fluid flowing in the fluid transporting mechanism 312 cannot flow to the mechanical valve 314 and into the tank 308. Accordingly, the solenoid valve 410 serves as a secondary or back-up valve preventing fluid flow into the tank 308 when the mechanical valve 314 (i.e., the primary valve in this configuration) has failed.

In accordance with certain illustrative embodiments the system may include a mechanism to notify a user/operator when the primary valve has failed and/or when the primary valve has shut off. The notification mechanism may be a visual notification mechanism, an audio notification mechanism, or an audio-visual notification mechanism.

For instance, in one illustrative embodiment a visual notification may be provided by turning on a visual notification mechanism 434 such as, for example, a warning light or a strobe light. In certain illustrative embodiment the visual notification mechanism 434 may be mounted on the control box 318. However, as would be appreciated by those of ordinary skill in the art, the present disclosure is not limited to this particular configuration. For instance, the visual notification mechanism 434 corresponding to each fluid tank 308A, 308B, 308C may be located in a central location that is easily visible to the operator. Moreover, in certain illustrative embodiments the visual warning may be accompanied by an audio warning such as a sirens or other sounds to bring the failure of the primary valve to the operator's attention.

In certain illustrative embodiments the notification mechanism generates a notification when the float 316 connects to the contact 416. Accordingly, in the illustrative embodiments of FIGS. 3-4 where the electric valve acts as the secondary valve, the notification mechanism generates a notification when the secondary valve has been shut off. In contrast, in the embodiment of FIG. 5 where the electric valve acts as the primary valve, the notification mechanism may generate a notification when the primary valve has been shut off.

Figure 6:
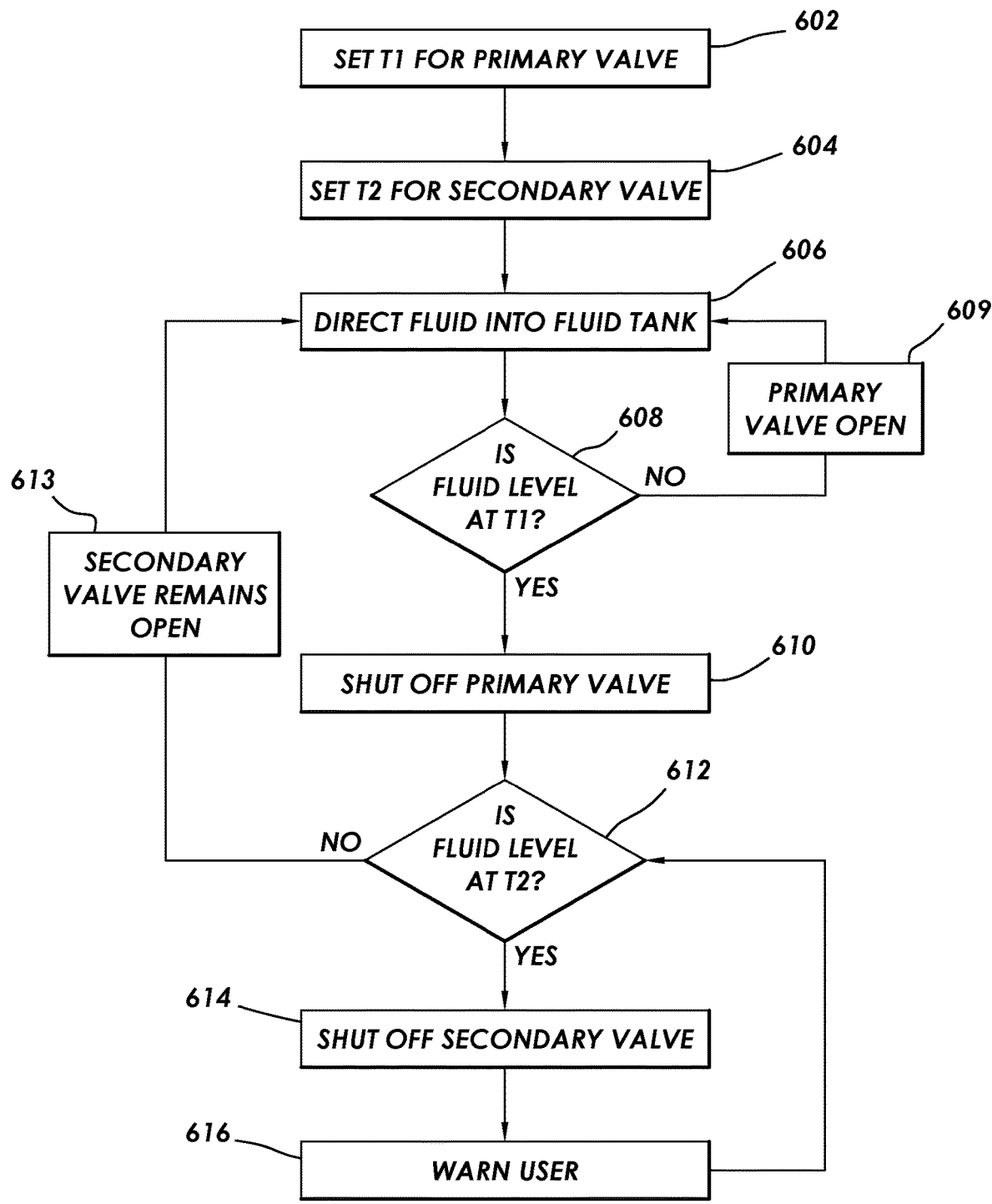
FIG. 6 depicts an illustrative example of method steps performed using the system of FIGS. 3-5 in accordance with an exemplary embodiment of the present disclosure.

Accordingly, an operator can safely deliver fluid to one or more fluid consuming assets at a job site using the improved methods and systems of the present disclosure. An illustrative improved method for delivering fluid to a fluid consuming asset using the fluid delivery system of the present disclosure is now described in conjunction with FIG. 6. While the illustrative method of fluid delivery in accordance with the present disclosure contains a number of steps, one or more of these steps may be modified or eliminated without departing from the scope of the present disclosure. Similarly, additional steps may be added to the process without departing from the scope of the present disclosure. The illustrative method of fluid delivery in accordance with the present disclosure is provided as an example only and is not intended to be limiting.

The method steps refer to a primary valve and a secondary valve. As discussed in conjunction with FIGS. 3-5, the operator can selectively designate the mechanical valve or the electric valve as the primary or the secondary valve. The method steps will now be discussed in conjunction with the embodiment of FIGS. 3 and 4 where the mechanical valve serves as the primary valve and the electric valve serves as the secondary valve. However, as would be appreciated by those of ordinary skill in the art having the benefit of the present disclosure the same method steps may be utilized using the embodiment of FIG. 5 without departing from the scope of the present disclosure.

With the system configured as shown in FIGS. 3-4, when installing the primary valve and the secondary valve the operator sets the threshold level (T1 430) for the mechanical valve at step 602 and the threshold level (T2 432) for the electric valve at step 604. Fluid delivery is then initiated and fluid is delivered to the fluid tank 308 through the fluid transporting mechanism 312 at step 606. At step 608 it is determined whether the fluid level in the fluid tank 308 has reached T1. As long as the fluid level in the fluid tank 308 has not reached the threshold level T1 the primary valve remains open at step 609 and fluid continues to be delivered to the fluid tank 308 at step 606. Once the fluid level in the fluid tank 308 reaches the threshold level T1, at step 610 the primary valve is shut off. As the fluid consuming asset continues to draw fluid from the fluid tank 308, under normal operating conditions the fluid level in the fluid tank 308 will go down over time once fluid delivery ceases. Accordingly, at step 612 it is determined whether the fluid level in the fluid tank 308 has reached the threshold level T2. If the level of fluid in the fluid tank 308 has not reached the threshold level T2, that means the primary valve is operating properly to restrict fluid flow into the fluid tank 308 and accordingly, the secondary valve remains open at step 613 and the process returns to step 606 where fluid is directed into the fluid tank 308. With the primary valve operating properly, as the fluid consuming asset 310 consumes the fluid in the fluid tank 308 the level of fluid in the fluid tank 308 goes down. The primary valve will open once the fluid level is no longer at T1 to allow fluid flow into the fluid tank 308 at steps 609 and 606.

If, however, it is determined at step 612 that the level of fluid in the fluid tank 308 has reached the threshold level T2, that means that the primary valve failed to shut off at step 610 and restrict fluid flow into the fluid tank 308. Specifically, in the event of failure of the primary valve (e.g., due to malfunction, wear and tear, user error, etc.) the primary valve fails to restrict fluid flow into the fluid tank 308 at step 610 and the level of fluid continues to rise in the fluid tank 308. Specifically, in the illustrative embodiment of FIGS. 3-4, it is determined that the level of fluid in the fluid tank 308 has reached the threshold level T2 once the float 316 comes in contact with the contact 416. Of course, a level of fluid in the fluid tank 308 which is higher than the threshold level T2 likewise keeps the float 316 in contact with the contact 416. As long as the fluid level in the fluid tank 308 is below the threshold level T2 the secondary valve remains open at step 613 and the process returns to step 606 and fluid continues to be directed into the fluid tank 308. However, once the level of fluid reaches the threshold level T2 the float 316 connects to the contact 416 at which point the process continues to step 614 where the secondary valve (in this case, the solenoid valve 410) is shut off restricting fluid flow into the fluid tank 308.

Next, at step 616, the system may generate a warning (e.g., visual, audio, or audio visual warning) to the user informing the user of the failure of the primary valve so that the user can remedy the situation. As the fluid consuming asset 310 uses the fluid in the fluid tank 308, the level of fluid goes down. Accordingly, following the generation of the warning at step 618, the process returns to step 612 to determine if the fluid level is below the threshold level T2. If the fluid level in the fluid tank 308 has gone below the threshold level T2, then the float 316 will no longer be connected to the contact 416 at which point the secondary valve (in this case, the solenoid valve 410) is opened and the process returns to step 606 where fluid is again directed into the fluid tank 308. While the primary valve is not functioning, fluid will continue to be delivered to the fluid tank 308 with the fluid flow being regulated by the secondary valve to maintain the fluid level at or below the second threshold level T2.

However, if it is determined at step 612 that the fluid level is at the threshold level T2, the secondary valve remains closed at step 614 and the warning to the user continues to be generated at step 616. As would be appreciated by those of ordinary skill in the art, having the benefit of the present disclosure, a fluid level in the fluid tank 308 that is above the threshold level T2 will likewise satisfy this condition as the float 316 will be in contact with the contact 416 under such conditions. As would be appreciated by those of ordinary skill in the art, having the benefit of the present disclosure, once the primary valve is fixed or replaced, the fluid level in the fluid tank 308 remains below the threshold level T2 (because the primary valve will restrict fluid flow once the fluid level reaches T1 at step 610) and therefore, the process will not go through steps 614 and 616.

Figure 7:
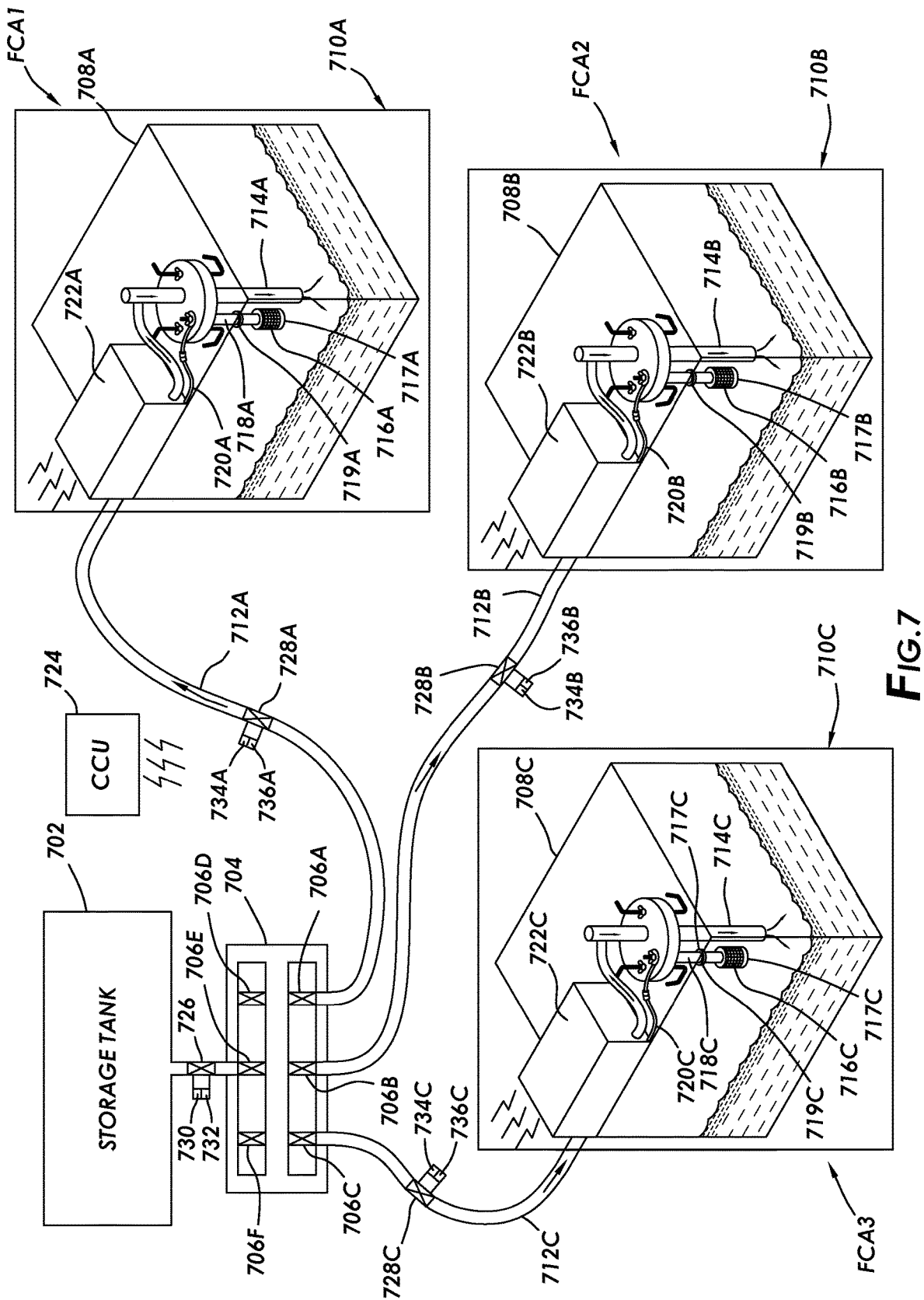
FIG. 7 is a system for delivering fluid to one or more fluid consuming assets in accordance with another illustrative embodiment of the present disclosure.

FIG. 7 depicts a system for delivering fluid to a fluid consuming asset in accordance with another illustrative embodiment of the present disclosure. A fluid supply tank (or storage tank) 702 is fluidically coupled to a manifold 704 having a plurality of outlets 706A, 706B, 706C, 706D, 706E, 706F. The outlets 706A, 706B, 706C are each fluidically coupled to and deliver fluid to a fluid tank 708A, 708B, 708C of a corresponding fluid consuming asset 710A, 710B, 710C. The number of outlets 706 and fluid consuming assets 710 is depicted for illustrative purposes only and there may be fewer or more outlets 706 or fluid consuming assets 710 utilized without departing from the scope of the present disclosure. Moreover, although a single fluid tank 708 is depicted for each fluid consuming asset 710, the present disclosure is not limited to this particular configuration and as would be appreciated by those of ordinary skill in the art a single fluid consuming asset 710 may use more than one fluid tank 708.

Like the fluid tanks 308 of FIG. 3, each of the fluid tanks 708A, 708B, 708C receives fluid from a corresponding manifold outlet 706A, 706B, 706C through a fluid transporting mechanism 712A, 712B, 712C. Additionally, each fluid tank 708A, 708B, 708C includes a corresponding mechanical valve 714A, 714B, 714C. The mechanical valve 714A, 714B, 714C may be any valve mechanism that operates mechanically to restrict fluid flow into the fluid tank 708A, 708B, 708C once the level of fluid therein exceeds a preset threshold in the same manner as discussed in conjunction with the embodiment of FIGS. 3-5. Such mechanical valve systems are disclosed for example, by the Applicants in U.S. application Ser. No. 16/171,180 and U.S. application Ser. No. 16/809,176, both of which are incorporated by reference herein. Further, like the embodiment of FIG. 3, each fluid tank 708A, 708B, 708C may include an electric probe 718A, 718B, 718C disposed therein with a probe control line 720A, 720B, 720C extending therefrom.

A float 716A, 716B, 716C is disposed on the electric probe 718A, 718B, 718C and is movable between the seat 717A, 717B, 717C and the contact 719A, 719B, 719C in a manner similar to the float 316 described in conjunction with the embodiment of FIGS. 3 and 4.

The illustrative embodiment of FIG. 7 may further include a mainline solenoid valve 726 and/or a distribution solenoid valve 728A, 728B, 728C associated with corresponding outlets of the manifold 706A, 706B, 706C. As would be appreciated by those of ordinary skill in the art, having the benefit of the present disclosure, although the present disclosure is described in conjunction with a configuration using solenoid valves, the present disclosure is not limited to that particular configuration. Specifically, the mainline solenoid valve 726 and the distribution solenoid valve 728 may be replaced by any other suitable electric valve and referred to as the first electric valve and second electric valve or the mainline electric valve and the distribution electric valve, respectively, without departing from the scope of the present disclosure.

Moreover, as would be appreciated by those of ordinary skill in the art, having the benefit of the present disclosure, the present disclosure is not limited to the particular configuration shown in FIG. 7. For instance, a distribution solenoid valve 728 may only be utilized on one of the manifold outlets 706; the mainline solenoid valve 726 may be eliminated; or the distribution solenoid valves 728 may be eliminated without departing from the scope of the present disclosure. Moreover, in certain illustrative embodiments two or more of the outlets 706 of the manifold 704 may be grouped together and fluid flow to this group of outlets 706 may be controlled by a solenoid valve. All these configurations are within the scope of the present disclosure and may be implemented without departing from the scope of the present disclosure.

In certain illustrative embodiments, the mainline solenoid valve 726 may be equipped with a transmitter 730 and/or a receiver 732 for transmitting and receiving information. Likewise, each distribution solenoid valve 728 may be equipped with a transmitter 734 and/or a receiver 736 for transmitting and receiving information. The transmitters 730/734 and receivers 732/736 associated with the mainline solenoid valve 726 or any of the distribution solenoid valves 728 are operable to send and/or receive information using any suitable network configuration such as, for example, by using a satellite connection or a communications standard-wireless network such as, for example, Wi-Fi, Wide Area Network ("WAN"), 2G, 3G, 4G, 5G or a combination thereof. Moreover, in certain illustrative embodiments the transmitters 730/734 and receivers 732/736 associated with the mainline solenoid valve 726 or any of the distribution solenoid valves 728 may be communicatively coupled to other system components through a wired Local Area Network ("LAN").

In the illustrative embodiment of FIG. 7, the control box 318 of the embodiment of FIG. 3 is replaced by a Wireless Relay Node ("WRN") 722A, 722B, 722C. Specifically, a WRN 722A may be associated with a corresponding fluid tank 708A. Although in the illustrative embodiment of FIG. 7 the WRN 722 is depicted as being mounted on the fluid tank 708, the present disclosure is not limited to this particular configuration and the WRN 722 may be disposed at any desirable location proximate to the fluid tank 708.

Figure 8:
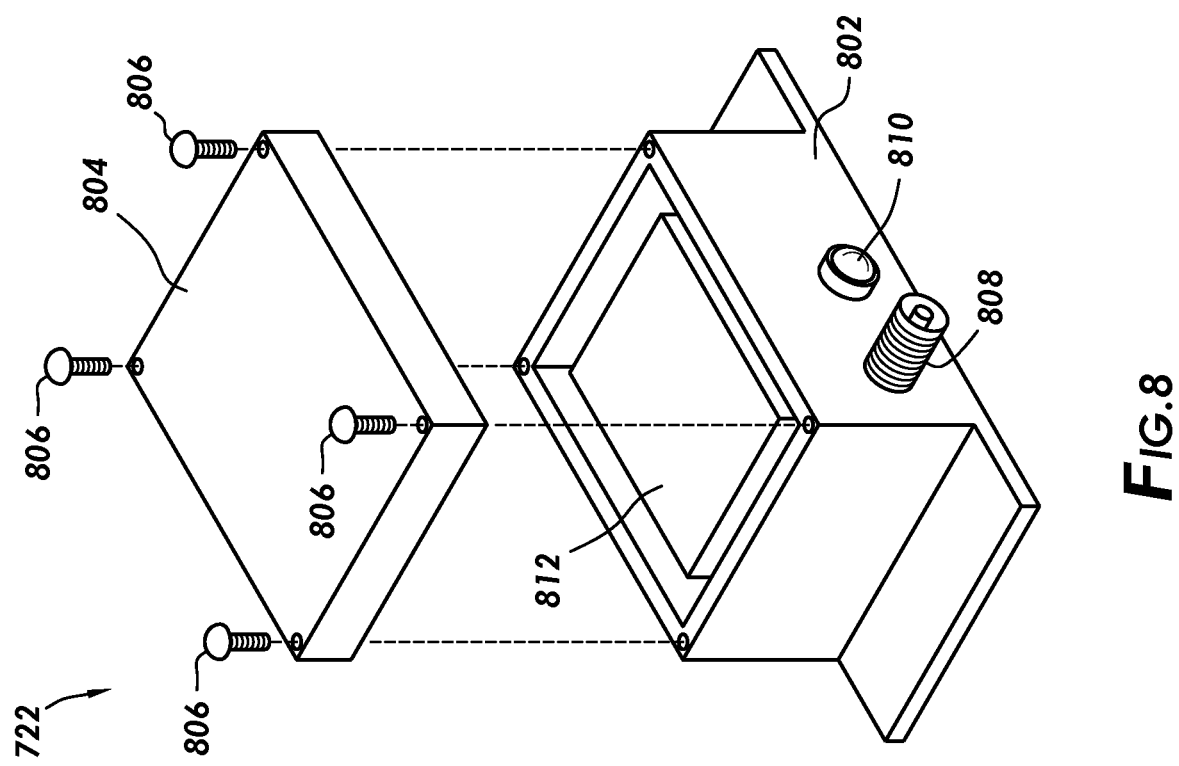
FIG. 8 is a perspective view of an illustrative embodiment of the Wireless Relay Node of FIG. 7 in accordance with an illustrative embodiment of the present disclosure.

FIG. 8 is a close-up perspective view of a WRN 722 in accordance with an illustrative embodiment of the present disclosure. In this illustrative embodiment, the WRN 722 may include a housing 802 and a cover 804. The cover 804 may be detachably coupled to the housing 802 to facilitate easy access to the WRN 722 components when desired such as, for example, when a repair or service is required. For instance, in certain illustrative embodiments, the cover 804 maybe detachably coupled to the housing 802 using screws 806. The housing 802 and the cover 804 may serve as a shield protecting the circuitry components of the WRN 722. The housing 802 may include a connection port 808 and a pairing interface 810 on an outside surface thereof. A Relay Node Circuitry ("RNC") 812 is disposed within the housing 802 and manages the operations of the WRN 722.

Figure 9:
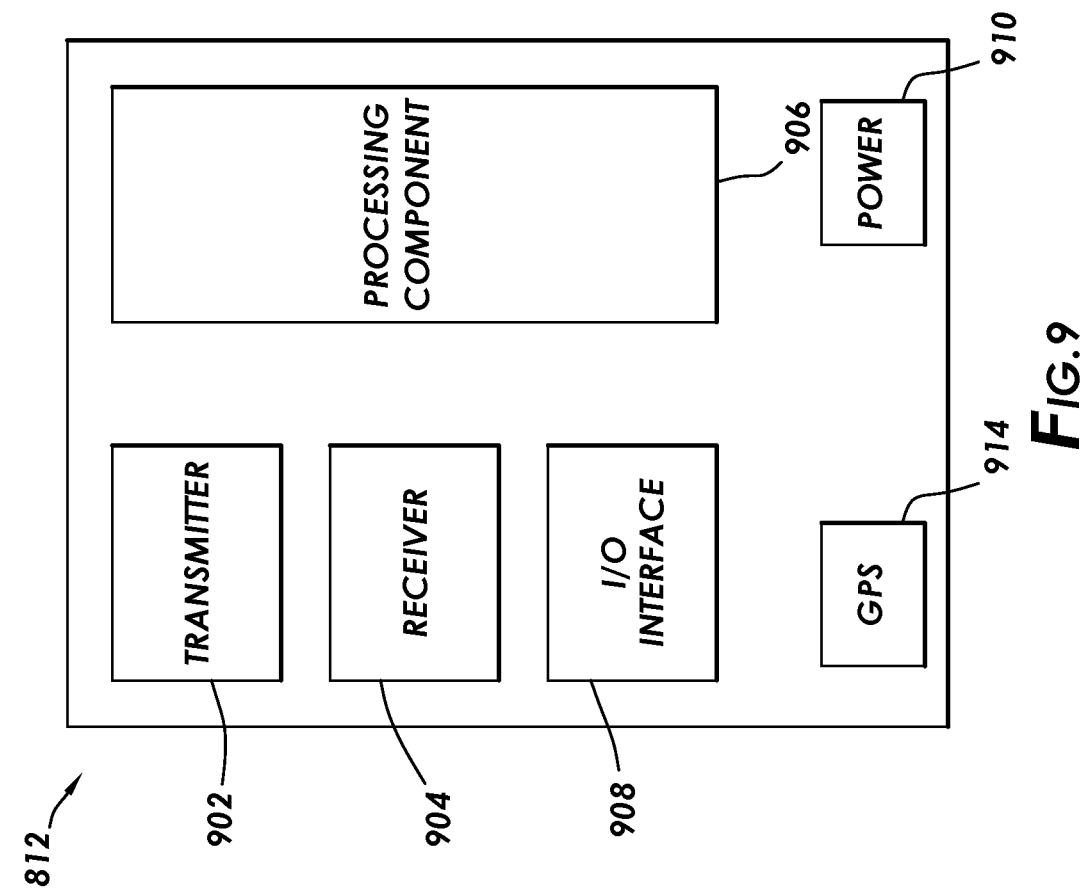
FIG. 9 is a block diagram of a Relay Node Circuitry in accordance with an illustrative embodiment of the present disclosure.

FIG. 9 depicts a block diagram of a RNC 812 in accordance with an illustrative embodiment of the present disclosure. In this illustrative embodiment, the RNC 812 may optionally include, for example, a transmitter 902 operable to transmit information (e.g., data, instructions, etc.) from the WRN 722, a receiver 904 operable to receive information by the WRN 722, a processing component 906 operable to process any information received or to be transmitted by the WRN 722 and an I/O interface 908 which is operable to provide an interface between any I/O devices (e.g., the paring interface 810, any I/O device connected to the connection port or other optional user interface functionalities that may be provided depending on the particular implementation) and the processing component 906. The term "information" has used herein may include, for example, any data or instructions that are transmitted to or from the RNC 812 and hence, the WRN 722. The I/O interface 908 may be communicatively coupled to, for example, the connection port 808 and/or the pairing interface 810. The RNC 812 may further include a Global Positioning System (or GPS) 914 which keeps track of the geographical location (e.g., geographical coordinates) of the WRN 722. The GPS 914 may provide the geographical coordinates of the WRN 722 to the processing component 906 upon request or on preset time intervals.

The transmitter 902 and the receiver 904 are configured to facilitate wired or wireless communication between the WRN 722 and a Central Control Unit ("CCU") 724. The structure and operation of the CCU 724 is discussed in further detail below.

For instance, the transmitter 902 and the receiver 904 may communicate wirelessly with the CCU 724 by using a satellite connection or a communications standard-wireless network such as, for example, Wi-Fi, 2G, 3G, 4G, 5G or a combination thereof. Moreover, in certain illustrative embodiments the WRN 722 and the CCU 724 may be communicatively coupled through a wired Local Area Network ("LAN") or the Ethernet. Similarly, the transmitter 902 and the receiver 904 may communicate wirelessly with the mainline solenoid valve 726 and/or the distribution solenoid valve 728 by using a satellite connection or a communications standard-wireless network such as, for example, Wi-Fi, 2G, 3G, 4G, 5G or a combination thereof. Moreover, in certain illustrative embodiments the WRN 722 and the mainline solenoid valve 726 and/or the distribution solenoid valve 728 may be communicatively coupled through a wired Local Area Network ("LAN") or the Ethernet. The implementation of such standards for transmitting and receiving information is well known to those of ordinary skill in the art, having the benefit of the present disclosure and therefore, will not be discussed in detail herein.

The RNC 812 may also include a power source 910 which is operable to provide power to the RNC 812 components. In certain illustrative embodiments, this power source 910 may be a battery which may be rechargeable. However, other sources of power may be utilized without departing from the scope of the present disclosure. For instance, in certain illustrative embodiments a solar cell (not shown) may be mounted on or near the fluid tank 708 and used to supply power to the RNC 812. In other embodiments, the RNC 812 may be directly connected to a power source. Finally, in other embodiments the RNC 812 may include a primary power source (e.g., a first battery) and a secondary (or back-up) power source (e.g., a second battery or solar cell). As would be appreciated by those of ordinary skill in the art, having the benefit of the present disclosure, in certain illustrative embodiments the RNC 812 may include other components as desired without departing from the scope of the present disclosure. Moreover, one or more of the RNC 812 components included herein may be eliminated or replaced without departing from the scope of the present disclosure.

Although in the illustrative embodiment of FIG. 7 each fluid tank 708A, 708B, 708C includes a corresponding WRN 722, the present disclosure is not limited to this particular configuration. For instance, in certain illustrative embodiments some of the fluid tanks 708 may not include a WRN 722 while in others, more than one WRN 722 may be provided for one or more of the fluid tanks 708 to provide redundancy without departing from the scope of the present disclosure.

Returning now to FIG. 7, in one illustrative embodiment the CCU 724 may be located on or proximate to the storage tank 702. However, this particular configuration is not intended to be limiting. For instance, the CCU 724 may be located anywhere on the job site or off the job site as desired for a particular application and depending on the nature of the wireless communication network utilized for communication between the CCU 724 and the transmitter/receiver of the WRN 722A.

FIG. 10 is a perspective view of the CCU 724 in accordance with an illustrative embodiment of the present disclosure. In accordance with certain illustrative embodiments, the CCU 724 may include a housing 1002 and a cover 1004. Within the housing 1002, the CCU 724 may include a Central Control Unit Circuitry (CCUC) 1006 and a display screen 1008. In certain illustrative embodiments a visual notification mechanism 1010 may be mounted on the housing 1002 or proximate thereto. Moreover, in certain illustrative embodiments the visual warning provided by the visual notification mechanism 1010 may be accompanied by a sirens or other audio notification mechanisms. Moreover, in certain illustrative embodiments, a user interface 1012 (e.g., buttons, a touch screen, etc.) may be provided on the cover 1004 or on the display 1008 allowing a user to interact with the CCU 724.

FIG. 11 is a block diagram of a CCUC 1006 in accordance with an illustrative embodiment of the present disclosure. The CCUC 1006 may optionally include a transmitter 1102 operable to transmit information (e.g., data, instructions, etc.) from the CCU 724, a receiver 1104 operable to receive information by the CCU 724, a processing component 1106 operable to process any information received or to be transmitted by the CCUC 1006, an I/O interface 1108 operable to provide an interface between any I/O device (e.g., user interface 1012) and the processing component 1106, a power source 1110 to power the CCUC 1006 components and a display interface 1112 which is communicatively coupled to the display screen 1008 and is operable to allow the display of messages to the user on the display 1008. The CCUC 1006 may further include a Global Positioning System (or GPS) 1114 which keeps track of the geographical location (e.g., geographical coordinates) of the CCU 724. The GPS 1114 may provide the geographical coordinates of the CCU 724 to the processing component 1106 upon request or on preset time intervals.

The transmitter 1102 and the receiver 1104 are configured to facilitate wired or wireless communication between the CCU 724 and other components such as, for example, the WRN 722, the mainline solenoid valve 726, the distribution solenoid valve 728 or other components (as discussed further below).

For instance, the transmitter 1102 and the receiver 1104 may communicate wirelessly with the WRN 722 by using a satellite connection or a communications standard-wireless network such as, for example, Wi-Fi, 2G, 3G, 4G, 5G or a combination thereof. Moreover, in certain illustrative embodiments the CCU 724 and the WRN 722 may be communicatively coupled through a wired Local Area Network ("LAN") or the Ethernet. Similarly, the transmitter 1102 and the receiver 1104 may communicate wirelessly with the mainline solenoid valve 726 and/or the distribution solenoid valve 728 by using a satellite connection or a communications standard-wireless network such as, for example, Wi-Fi, 2G, 3G, 4G, 5G or a combination thereof. Moreover, in certain illustrative embodiments the CCU 724 and the mainline solenoid valve 726 and/or the distribution solenoid valve 728 may be communicatively coupled through a wired Local Area Network ("LAN") or the Ethernet. The implementation of such standards for transmitting and receiving information is well known to those of ordinary skill in the art, having the benefit of the present disclosure and therefore, will not be discussed in detail herein.

In certain illustrative embodiments, the power source 1110 may be a battery which may be rechargeable. However, other sources of power may be utilized without departing from the scope of the present disclosure. For instance, in certain illustrative embodiments a solar panel (not shown) may be mounted on or near the CCU 724 and used to supply power to the CCUC 1006. In other embodiments, the CCUC 1006 may be directly connected to a power source. Finally, in other embodiments the CCUC 1006 may include a primary power source (e.g., a first battery) and a secondary (or back-up) power source (e.g., a second battery or solar panel). As would be appreciated by those of ordinary skill in the art, having the benefit of the present disclosure, in certain illustrative embodiments the CCUC 1006 may include other components as desired without departing from the scope of the present disclosure. Moreover, one or more of the CCUC 1006 components included herein may be eliminated or replaced without departing from the scope of the present disclosure.

The operation of FIG. 7 will now be discussed in conjunction with FIG. 12. The method steps refer to a primary valve and a secondary valve. As discussed in conjunction with FIGS. 3-5, the operator can selectively designate the mechanical valve or the electric valve as the primary or the secondary valve. In the illustrative embodiment of FIG. 7 the mechanical valve 714 serves as the primary valve and the electric valves (e.g., mainline solenoid valve 726 or distribution solenoid valve 728) serve as the secondary valve. However, this configuration is used for illustrative purposes. As discussed in conjunction with FIG. 3, the system can be just as easily configured to have the electric valves (e.g., mainline solenoid valve 726 or distribution solenoid valve 728) serve as the primary valve and the mechanical valves 714 serve as the secondary valve without departing from the scope of the present disclosure.

Turning now to FIG. 12, with the mechanical valve used as the primary valve and the electric valve used as the secondary valve, when installing the primary valve and the secondary valve the operator sets the threshold level (T1 430) for the mechanical valve at step 1202 and the threshold level (T2 432) for the electric valve at step 1204. Fluid delivery is then initiated and fluid is delivered to the fluid tank 708 through the fluid transporting mechanism 712 at step 1206. At step 1208 it is determined whether the fluid level in the fluid tank 708 has reached T1. As long as the fluid level in the fluid tank 708 has not reached the threshold level T1 the primary valve remains open at step 1209 and fluid continues to be delivered to the fluid tank 708 at step 1206. Once the fluid level in the fluid tank 708 reaches the threshold level T1, at step 1210 the primary valve is shut off. As the fluid consuming asset 710 continues to draw fluid from the fluid tank 708, under normal operating conditions the fluid level in the fluid tank 708 will go down over time once fluid delivery ceases. Accordingly, at step 1212 it is determined whether the fluid level in the fluid tank 708 has reached the threshold level T2. As long as the level of fluid in the fluid tank 708 has not reached the threshold level T2, that means the primary valve is operating properly to restrict fluid flow into the fluid tank 708 (or that even though the primary valve has failed, it is not time to shut of the secondary valve yet) and accordingly, the secondary valve remains open at step 1213 and the process returns to step 1206 where fluid is directed into the fluid tank 708. With the primary valve operating properly, as the fluid consuming asset 710 consumes the fluid in the fluid tank 708 the level of fluid in the fluid tank 708 goes down. The primary valve will open once the fluid level is no longer at T1 to allow fluid flow into the fluid tank 708 at steps 1209 and 1206.

If, however, it is determined at step 1212 that the level of fluid in the fluid tank 708 has reached the threshold level T2, that means that the primary valve failed to shut off at step 1210 and restrict fluid flow into the fluid tank 708. Specifically, in the event of failure of the primary valve (e.g., due to malfunction, wear and tear, user error, etc.) the primary valve fails to restrict fluid flow into the fluid tank 708 at step 1210 and the level of fluid continues to rise in the fluid tank 708. As long as the fluid level in the fluid tank 708 is below the threshold level T2 the secondary valve remains open at step 1213 and the process returns to step 1206 and fluid continues to be directed into the fluid tank 708. However, once the level of fluid reaches the threshold level T2 (and/or is above the threshold level T2) the float 716 connects to the contact 719 at which point the process continues to step 1214.

Specifically, in the event that it is determined at step 1212 that the fluid level in the fluid tank 708 has reached the threshold level T2, the process continues to step 1214 where a signal is sent through the probe control line 720 to the WRN 722. In one illustrative embodiment, this signal is received at the I/O interface 908 of the RNC 812 and is then delivered to the processing component 906. Once this signal is received, the processing component 906 recognizes that the primary valve (in this illustrative example, the mechanical valve 714) has failed. The transmitter 902 of the RNC 812 may then generate a notification to the CCU 724 at step 1216 informing the CCU 724 that the primary valve in the particular tank (e.g., 708A) corresponding to the particular WRN (e.g., 722A) has failed.

In accordance with certain illustrative embodiments, in order for the CCU 724 to recognize which particular fluid tank 708 a received message corresponds to, each WRN 722 may be "paired" with the CCU 724 prior to or during installation. Specifically, prior or during installation, the operator may designate each WRN 722A, 722B, 722C as corresponding to a particular tank 708A, 708B, 708C using the pairing interface 810 of the WRN 722 in conjunction with the user interface 1012 of the CCU 724. The details of pairing a transmitter/receiver pair in this manner are well known to those of ordinary skill in the art, having the benefit of the present disclosure and therefore, it will not be discussed in detail herein. In accordance with other illustrative embodiments of the present disclosure the message sent from the transmitter 902 of the RNC 812 to the receiver 1104 of the CCU 724 may include an identification tag identifying the fluid tank 708 from which the message is being transmitted thereby obviating the need for the WRN 722 to be paired with CCU 724 during installation.

In certain illustrative embodiments, at step 1216, in addition to sending a signal to the CCU 724, the WRN 722 may generate a local visual (e.g., warning light or strobe light), audio (e.g., sirens), or audio-visual notification informing any personnel on the field of the failure of the primary valve.

The message sent from the transmitter 902 of the RNC 812 may be received by the receiver 1104 of the CCUC 1006. This message is then relayed from the receiver 1104 to the processing component 1106 of the CCUC 1006. Depending on the particular application and user preferences, the processing component 1106 may be programmed to perform a number of tasks at step 1218 once the processing component 1106 of the CCUC 1006 receives this message from the WRN 722. For instance, in certain illustrative embodiments the processing component 1106 of the CCU 724 may send a signal through the transmitter 1102 to one or more solenoid valves 726, 728.

Specifically, at step 1220 the CCU 724 may shut off one or more solenoid valves 726, 728 depending on user preferences and may generate one or more notifications. As discussed above in conjunction with FIG. 7, the system may optionally include a mainline solenoid valve 726 and/or one or more distribution solenoid valves 728. Accordingly, in certain illustrative embodiments, the CCU 724 may transmit a signal to the receiver 732 of the mainline solenoid valve 726 shutting off that valve. In certain illustrative embodiments, the mainline solenoid valve 726 may send a responsive message back to the receiver 1104 of the CCUC 1006 through the transmitter 730 of the mainline solenoid valve 726 confirming that the valve has been shut off. With the mainline solenoid valve 726 shut off, fluid delivery to the manifold 704 is restricted. Accordingly, any fluid remaining in the manifold 704 or in the corresponding fluid transporting mechanism 712 will flow to the fluid tanks 708 and fluid flow to the fluid tank 708 will then stop.

Similarly, in certain illustrative embodiments the CCU 724 may transmit a signal to the receiver 736A of a distribution solenoid valve 728A shutting off that valve in response to receiving a message from a corresponding WRN 722A. In certain illustrative embodiments, the distribution solenoid valve 728A may send a responsive message back to the receiver 1104 of the CCUC 1006 through the transmitter 734A of the distribution solenoid valve 728A confirming that the valve has been shut off. With the distribution solenoid valve 728A shut off, fluid delivery to the corresponding fluid tank 708A is restricted while the remaining fluid tanks (e.g., 708B, 708C) continue to receive fluid from the manifold 704. Accordingly, any fluid remaining in the fluid transporting mechanism 712A downstream from the distribution solenoid valve 728A will flow to the corresponding fluid tank 708A and fluid flow to the fluid tank 708A will then stop. The relative location of the distribution solenoid valve 728A on the fluid transporting mechanism 712A between the manifold 704 and the fluid tank 708A is shown for illustrative purposes only and is not intended to be limiting. In certain illustrative embodiments the distribution solenoid valve 728A may be disposed proximate to or on the fluid tank 708A (similar to the embodiment of FIGS. 3-5) in order to minimize the amount of fluid that continues to flow into the fluid tank 708A after the distribution solenoid valve 728A is shut off.

In yet another embodiment, the CCU 724 may be programmed to shut off one or more different distribution solenoid valves 728A, 728B, 728C in response to the failure of a particular primary valve. For instance, an operator may find it desirable to stop fluid flow to fluid tanks 708A and 708B in case the primary valve in the fluid tank 708A fails. In such instances, the CCU 724 may be programmed through the user interface 1012 and the display interface 1112 such that upon receiving a message from the WRN 722A, the CCUC 1006 sends a message through the transmitter 1102 to the receivers 736A, 736B with instructions to shut off the distribution solenoid valves 728A, 728B. With the distribution solenoid valves 728A, 728B shut off, fluid flow to the fluid tanks 708A and 708B are restricted.

In addition to shutting off one or more solenoid valves (e.g., mainline solenoid valve 726 or distribution solenoid valves 728), at step 1222 the CCU 724 is operable to generate a warning signal upon receipt of a signal from the WRN 722 indicating the failure of a primary valve (e.g., 714A) in a given fluid tank (e.g., 708A). The CCU 724 may generate this warning signal in a number of ways depending on the particular implementation and/or operator preferences which may be programmed into the processing component 1106 of the CCUC 1006. In certain embodiments, a number of different options for generating a warning signal may be pre-programmed in the processing component 1106 and presented to the operator on the display 1008. The operator may then use the user interface 1012 to select the option best suited for the particular implementation.

In certain illustrative embodiments, the CCU 724 may generate a warning signal that optionally includes one or more pieces of information about the failed primary valve(s). For instance, this message may identify the particular fluid tank 708 that corresponds to the failed primary valve. Optionally, the message may include other additional information such as, for example: (1) the time at which the primary valve failed; (2) the location of the particular fluid tank in which the primary valve has failed (which may be relayed from the processing component 906 of the RNC 812 in a WRN 722 upon receipt from the GPS 914 component); (3) the volume of fluid in the fluid tank corresponding to the failed primary valve (which may be monitored by the WRN 722 in a number of ways such as, for example, by monitoring fluid flow at the inlet of the fluid tank and the outlet of the fluid tank); (4) the capacity of the fluid tank corresponding to the failed primary valve; (5) the name of the equipment (if applicable) associated with the fluid tank corresponding to the failed primary valve; (6) the type of fluid being delivered to the fluid tank corresponding to the failed primary valve; and/or (7) the name of the manufacturer of the primary valve that failed.

The CCU 724 may generate the warning signal in a number of ways. For instance, in certain illustrative embodiments, the CCU 724 may generate the warning signal by displaying it as a message in the display 1008. In other embodiments, the CCU 724 may transmit the warning signal as a message (e.g., an email or text message) to one or more individuals whose contact information (e.g., email address, cell phone numbers, etc.) have been pre-programmed into the processing component 1106 or provided to the processing component 1106 during or after the system installation through the user interface 1012 and the display 1008. In other embodiments, the CCU 724 may generate the warning signal as a visual warning (e.g., a warning light or strobe light), an audio warning (e.g., sirens) or an audio-visual warning. In certain illustrative embodiments the CCU 724 may send the warning signal as a message to a predetermined server and the message may be displayed to one or more individuals on a display screen through, for example, a web browser or any other desirable user interface such as any other graphical user interface.

As would be appreciated by those of ordinary skill in the art, having the benefit of the present disclosure, the recited ways in which the warning signal is generated by the CCU 724 is illustrative only and is not intended to provide an exhaustive list of ways in which the signal may be provided to an operator or others. Moreover, as would be appreciated by those of ordinary skill in the art, having the benefit of the present disclosures, a combination of one or more of the ways in which the warning signal is generated may be used without departing from the scope of the present disclosure.

Returning now to FIG. 12, in certain illustrative embodiments, once the CCU 724 generates a warning signal at step 1222, the process continues to step 1224 where it is determined whether the fluid level in the fluid tank 708 is below the level T2. Specifically, as the fluid consuming asset 710 uses the fluid in the fluid tank 708, the fluid level in the fluid tank 708 goes down and the float 716 is disconnected from the contact 719. With the float 716 disconnected from the contact 719, the signal going through the probe control line 720 ceases to be transmitted and the WRN 722 recognizes that the fluid level in the fluid tank 708 has reached a level below T2. WRN 722 may communicate this information to the CCU 724 in the same manner discussed above in conjunction with step 1216.

If it is determined at step 1224 that the fluid level in the fluid tank 708 is below the level T2, then at step 1226 the CCU 724 (or, in embodiments where the WRN 722 can directly communicate with the solenoid valves 726/728, the WRN 722) may send a signal to one or more of the solenoid valves 726/728 that were shut off at step 1220 instructing them to open back up to resume fluid flow into the fluid tank 708. Fluid is then directed into the fluid tank at step 1228. The process then continues to step 1230 to determine whether the fluid level in the fluid tank 708 has reached the level T2 again. If the fluid level in the fluid tank 708 has not reached the level T2, the process returns to step 1226 and fluid continues to be delivered to the fluid tank 708. Once it is determined at step 1230 that the level of fluid in the fluid tank 708 has reached the level T2, the process returns to step 1220 where the secondary valve is shut off to restrict fluid flow into the fluid tank 708. In certain illustrative embodiments a notification may be generated at step 1222 each time a solenoid valve is shut off at step 1220. In other illustrative embodiments, a notification may be generated the first time the solenoid valve 726/728 is shut off but there may not be subsequent notifications generated at step 1222 each time the solenoid valve 726/728 are opened and closed to regulate fluid flow into the fluid tank 708. Accordingly, the secondary valve takes over controlling fluid flow into the fluid tank 708 by maintaining the fluid level at T2 until the user addresses the issue with the primary valve. Once the primary valve is fixed or replaced, the system can be reset back to step 1206.

If it is determined at step 1224 that the fluid level in the fluid tank 708 is not below the level T2 the process continues to step 1232 and the solenoid valves 726/728 remain shut off.

In certain illustrative embodiments, steps 1216 and 1218 of FIG. 12 may be eliminated and instead, the WRN 722 may be programmed to directly send a signal to the mainline solenoid valve 726 and/or the distribution solenoid valve 728 (in the same manner discussed above in conjunction with the CCU 724) to shut-off one or more solenoid valves and prevent fluid flow to the fluid tank 708 in which the primary valve 714 failed.

Moreover, as would be appreciated by those of ordinary skill in the art, having the benefit of the present disclosure, in certain illustrative embodiments the mainline solenoid valve 726 may be used in conjunction with one or more distribution solenoid valves 728 and a primary valve 714 in order to provide a third level of redundancy should both the primary valve 714 and the distribution solenoid valve 728 fail. In this illustrative embodiment, the mechanical valve 714 may serve as the primary valve, the distribution solenoid valves 728 may serve as a secondary valve, and the mainline solenoid valve 726 may serve as the tertiary valve as described in further detail below in conjunction with the illustrative embodiment of FIG. 13.

Figure 13:
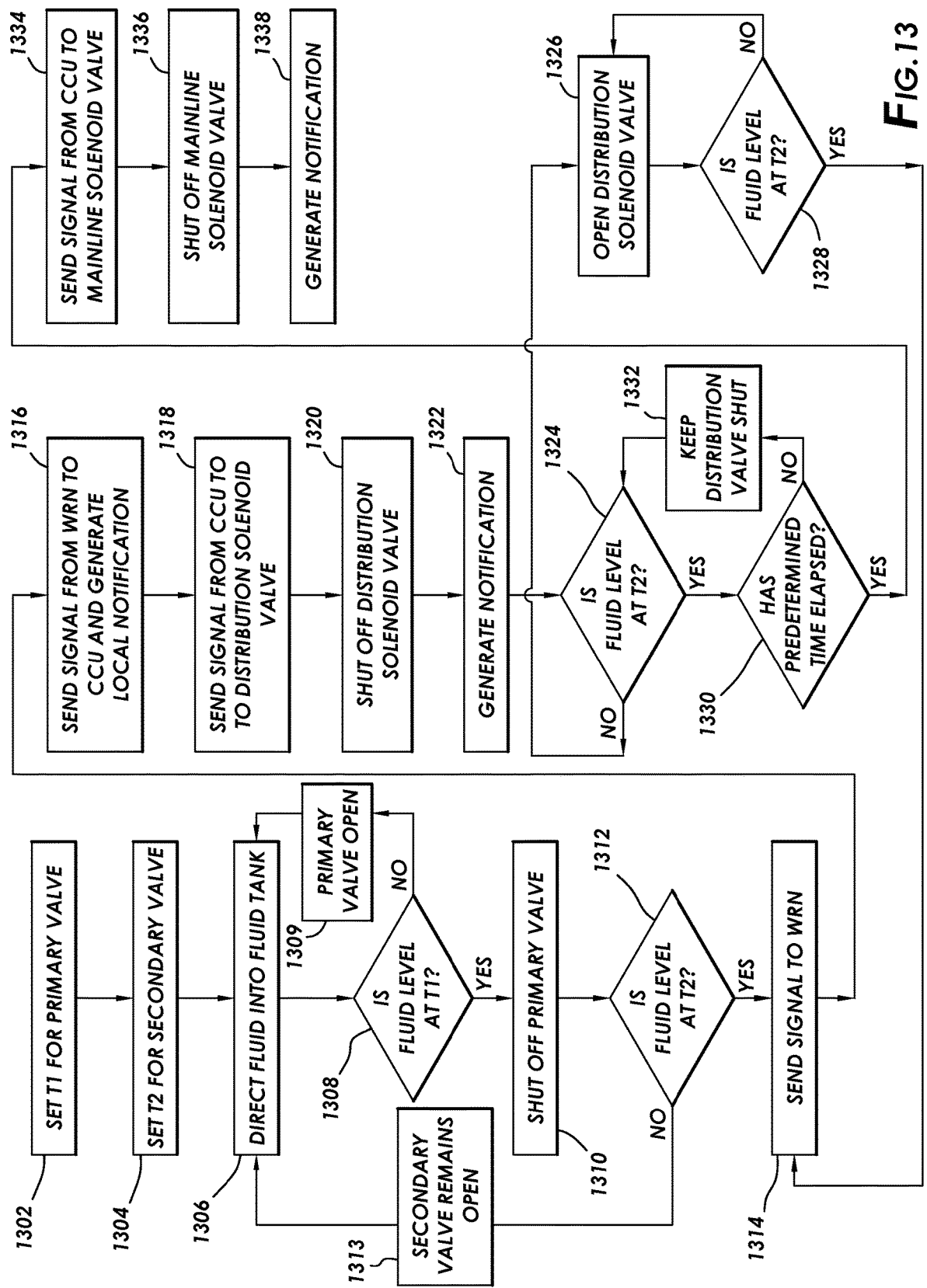
FIG. 13 depicts an illustrative example of method steps performed using the system of FIG. 7 in accordance with a second exemplary embodiment of the present disclosure.

Turning now to FIG. 13, with the mechanical valve used as the primary valve and the electric valve used as the secondary valve, when installing the primary valve and the secondary valve the operator sets the threshold level (T1 430) for the mechanical valve at step 1302 and the threshold level (T2 432) for the electric valve at step 1304. Fluid delivery is then initiated and fluid is delivered to the fluid tank 708 through the fluid transporting mechanism 712 at step 1306. At step 1308 it is determined whether the fluid level in the fluid tank 708 has reached T1. As long as the fluid level in the fluid tank 708 has not reached the threshold level T1 the primary valve remains open at step 1309 and fluid continues to be delivered to the fluid tank 708 at step 1306. Once the fluid level in the fluid tank 708 reaches the threshold level T1, at step 1310 the primary valve is shut off. As the fluid consuming asset 710 continues to draw fluid from the fluid tank 708, under normal operating conditions the fluid level in the fluid tank 708 will go down over time once fluid delivery ceases. Accordingly, at step 1312 it is determined whether the fluid level in the fluid tank 708 has reached the threshold level T2. As long as the level of fluid in the fluid tank 708 has not reached the threshold level T2, that means the primary valve is operating properly to restrict fluid flow into the fluid tank 708 and accordingly, the secondary valve (in this example, the distribution solenoid valve 728) remains open at step 1313 and the process returns to step 1306 where fluid is directed into the fluid tank 708. With the primary valve operating properly, as the fluid consuming asset 710 consumes the fluid in the fluid tank 708 the level of fluid in the fluid tank 708 goes down. The primary valve will open once the fluid level is no longer at T1 to allow fluid flow into the fluid tank 708 at steps 1309 and 1306.

If, however, it is determined at step 1312 that the level of fluid in the fluid tank 708 has reached the threshold level T2, that means that the primary valve failed to shut off at step 1310 and restrict fluid flow into the fluid tank 708. Specifically, in the event of failure of the primary valve (e.g., due to malfunction, wear and tear, user error, etc.) the primary valve fails to restrict fluid flow into the fluid tank 708 at step 1310 and the level of fluid continues to rise in the fluid tank 708. As long as the fluid level in the fluid tank 708 is below the threshold level T2 the secondary valve remains open at step 1313 and the process returns to step 1306 and fluid continues to be directed into the fluid tank 708. However, once the level of fluid reaches the threshold level T2 the float 716 connects to the contact 719 at which point the process continues to step 1314.

Specifically, in the event that it is determined at step 1312 that the fluid level in the fluid tank 708 has reached the threshold level T2, the process continues to step 1314 where a signal is sent through the probe control line 720 to the WRN 722. In one illustrative embodiment, this signal is received at the I/O interface 908 of the RNC 812 and is then delivered to the processing component 906. Once this signal is received, the processing component 906 recognizes that the primary valve (in this illustrative example, the mechanical valve 714) has failed. The transmitter 902 of the RNC 812 may then generate a notification to the CCU 724 at step 1316 informing the CCU 724 that the primary valve in the particular tank (e.g., 708A) corresponding to the particular WRN (e.g., 722A) has failed.

In certain illustrative embodiments, at step 1316, in addition to sending a signal to the CCU 724, the WRN 722 may generate a local visual (e.g., warning light or strobe light), audio (e.g., sirens), or audio-visual signal informing any personnel on the field of the failure of the primary valve.

The message sent from the transmitter 902 of the RNC 812 may be received by the receiver 1104 of the CCUC 1006. This message is then relayed from the receiver 1104 to the processing component 1106 of the CCUC 1006. Depending on the particular application and user preferences, the processing component 1106 may be programmed to perform a number of tasks at step 1318 once the processing component 1106 of the CCUC 1006 receives this message from the WRN 722.

For instance, in certain illustrative embodiments, the CCU 724 may transmit a signal to the receiver 736A of the distribution solenoid valve 728A shutting off that valve in response to receiving a message from a corresponding WRN 722A. Specifically, the processing component 1106 of the CCU 724 may send a signal through the transmitter 1102 to a distribution solenoid valve 728A corresponding to the particular fluid tank 708A in which the primary valve 714A has failed. This signal may be received by the receiver 736A of the distribution solenoid valve 728. In certain illustrative embodiments the distribution solenoid valve 728 may acknowledge the receipt of that signal by transmitting a signal back to the CCUC 1006 through the transmitter 734A. In response to the signal received from the CCU 724, at step 1320 the distribution solenoid valve 728A corresponding to the particular fluid tank 708A in which the primary valve 714A has failed may be shut off. In certain illustrative embodiments, the distribution solenoid valve 728A may send a responsive message back to the receiver 1104 of the CCUC 1006 through the transmitter 734A of the distribution solenoid valve 728A confirming that the valve has been shut off.

With the distribution solenoid valve 728A shut off, fluid delivery to the corresponding fluid tank 708A is restricted which the remaining fluid tanks (e.g., 708B, 708C) continue to receive fluid from the manifold 704. Accordingly, any fluid remaining in the fluid transporting mechanism 712A downstream from the distribution solenoid valve 728A will flow to the corresponding fluid tank 708A and fluid flow to the fluid tank 708A will then stop. The relative location of the distribution solenoid valve 728A on the fluid transporting mechanism 712A between the manifold 704 and the fluid tank 708A is shown for illustrative purposes only and is not intended to be limiting. In certain illustrative embodiments the distribution solenoid valve 728A may be disposed proximate to or on the fluid tank 708A (similar to the embodiment of FIG. 3) in order to minimize the amount of fluid that continues to flow into the fluid tank 708A after the distribution solenoid valve 728A is shut off.

As discussed in further detail above in conjunction with FIG. 12, in certain illustrative embodiments, the system may be designed such that more than one distribution solenoid valve 728 is shut off when a particular mechanical valve 714 malfunctions. Moreover, as discussed in conjunction with FIG. 12, in certain illustrative embodiments the WRN 722 may be operable to directly communicate with the distribution solenoid valve 728 and the mainline solenoid valve 726 bypassing the CCU 724 without departing from the scope of the present disclosure.

In addition to shutting off one or more distribution solenoid valves 728, at step 1322 the CCU 724 may be operable to generate a warning signal upon receipt of a signal from the WRN 722 indicating the failure of a primary valve (e.g., 714A) in a given fluid tank (e.g., 708A). The CCU 724 may generate this warning signal in a number of ways depending on the particular implementation and/or operator preferences which may be programmed into the processing component 1106 of the CCUC 1006. The generation of such warning signals is described in further detail in conjunction with FIG. 12 above and may be implemented in the same manner in the embodiment of FIG. 13.

In certain illustrative embodiments, once the CCU 724 generates a warning signal at step 1322, the process continues to step 1324 where it is determined whether the fluid level in the fluid tank 708 is at the threshold level T2. Specifically, as the fluid consuming asset 710 uses the fluid in the fluid tank 708, the fluid level in the fluid tank 708 goes down and the float 716 is disconnected from the contact 719. With the float 716 disconnected from the contact 719, the signal going through the probe control line 720 ceases to be transmitted and the WRN 722 recognizes that the fluid level in the fluid tank 708 has reached a level below T2. WRN 722 may communicate this information to the CCU 724 in the same manner discussed above in conjunction with step 1316.

The process then proceeds to step 1324 where it is determined whether the fluid level in the fluid tank 708 is at the threshold level T2. As discussed above, in certain illustrative embodiments, if the float 716 is in contact with the contact 719, the fluid level is determined to be at the threshold level T2. However, if the float 716 is not in contact with the contact 719, the fluid level is determined not to be at level T2. If it is determined at step 1324 that the fluid level is not at the threshold level T2, that indicated that the distribution solenoid valve 728A effectively restricted fluid flow into the fluid tank 708A when it was shut off at step 1320. The distribution solenoid valve 728A is then opened at step 1326 to once again allow fluid flow into the fluid tank 708A. Next, at step 1328 it is determined if the fluid level in the fluid tank 708A has reached the threshold level T2. If the level of fluid in the fluid tank 708 has not reached the threshold level T2, the distribution solenoid valve 728A is open at step 1326 and fluid continues to be delivered to the fluid tank 708A. However, once the fluid level in the fluid tank 708A reaches the threshold level T2. then the process returns to step 1314 and the process will continue with the distribution solenoid valve 728 regulating fluid flow and keeping the fluid level at or below the threshold level T2 while the user can repair or replace the primary valve.

As would be appreciated by those of ordinary skill in the art, having the benefit of the present disclosure, the warning signals generated by the WRN 722 and/or the CCU 724 may optionally be only generated the first time the fluid level in the fluid tank 708A reaches the threshold level T2 or the warning signals may be generated each time the threshold level T2 is reached.

Returning now to step 1324, if it is determined that the fluid level in the fluid tank 708A is at the threshold level T2, the process continues to step 1330 where it is determined whether a predetermined amount of time has elapsed. Specifically, this is an optional step which the user may optionally use to give the system some lag time before the tertiary valve takes over the operations from the secondary valve. Stated otherwise, this predetermined amount of time corresponds to the amount of time the system allows for the distribution solenoid valve 728A to regulate fluid flow into the fluid tank 708A. Once this amount of time has elapsed and the fluid level in the fluid tank 708A has not reached a level below the threshold level T2, that can be taken as an indication that the distribution solenoid valve 728A has failed to effectively restrict fluid flow to the fluid tank 708A. In certain illustrative embodiments, the user may designate any appropriate time interval such as, for example, 1 minute, 5 minutes, or 15 minutes as the predetermined time interval of step 1330. In certain illustrative embodiments, the user may input the predetermined time interval at the CCU 724 using the user interface 1012. In certain illustrative embodiments the WRN 722 may send a signal to the CCU 724 once the predetermined amount of time has elapsed and the fluid level in the fluid tank 708 has remained at the threshold level T2.

If it is determined at step 1330 that the predetermined amount of time has not elapsed, the process continues to step 1332 where the distribution solenoid valve 728A remains shut at step 1332 and then the process returns to step 1324 to monitor whether the fluid level in the fluid tank 708A is still at the threshold level T2.

Once it is determined at step 1330 that the predetermined amount of time has elapsed, the system recognizes that the distribution solenoid valve 728A has failed to effectively regulate fluid flow into the fluid tank 708A and it is time for the tertiary valve to take over regulating the fluid flow. The process then continues to step 1334 and a signal is sent from the CCU 724 to the mainline solenoid valve 726 to shut off the mainline solenoid valve 726. In accordance with one illustrative embodiment, the processing component 1106 of the CCU 724 may send a signal through the transmitter 1102 to a mainline solenoid valve 726. This signal may be received by the receiver 732 of the mainline solenoid valve 726. In certain illustrative embodiments the mainline solenoid valve 726 may acknowledge the receipt of that signal by transmitting a signal back to the CCUC 1006 through the transmitter 730. In response to the signal received from the CCU 724, at step 1336 the mainline solenoid valve 726 may be shut off.

In addition to shutting off the mainline solenoid valve 726, at step 1338 the CCU 724 may be operable to generate a warning signal indicating the failure of the particular distribution solenoid valve 728A (i.e., the secondary valve). The CCU 724 may generate this warning signal in a number of ways depending on the particular implementation and/or operator preferences which may be programmed into the processing component 1106 of the CCUC 1006. The generation of such warning signals is described in further detail in conjunction with FIG. 12 above and may be implemented in the same manner in the embodiment of FIG. 13.

Accordingly, the mainline solenoid valve 726 acts as a tertiary valve that can shut off fluid flow into a fluid tank 708A and prevent overfills and spills if both the primary valve (e.g., mechanical valve 714A) and the secondary valve (e.g., distribution solenoid valve 728A) fail to regulate fluid flow into the fluid tank 708A.

Figure 14:
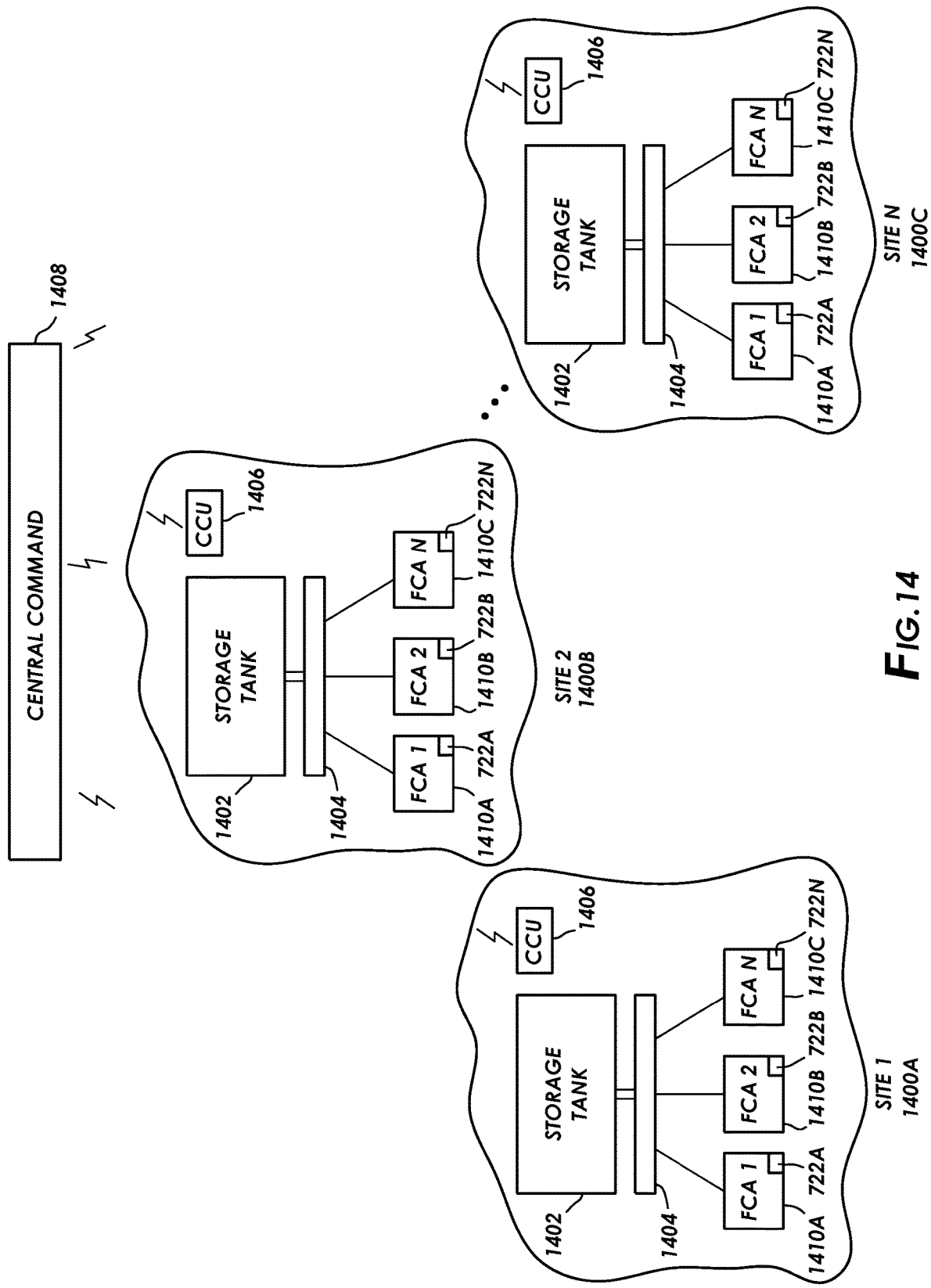
FIG. 14 depicts a system for monitoring and controlling fluid flow to multiple job sites in accordance with another illustrative embodiment of the present disclosure.

FIG. 14 depicts a system for monitoring and controlling fluid flow to multiple job sites in accordance with another illustrative embodiment of the present disclosure. Specifically, a plurality of job sites 1400A, 1400B, 1400C may be configured in a manner similar to the embodiment of FIG. 7 with each job site having a storage tank 1402 that delivers fluid to one or more fluid consuming asset 1410A, 1410B, 1410C through a manifold 1404. As in the embodiment of FIG. 7, each fluid consuming asset 1410 may include corresponding WRN 722 that can communicate with a CCU 1406 on the job site. The details of the structure and operations at each job site 1400 mirrors the embodiment of FIG. 7 which is discussed in further detail above. In the embodiment of FIG. 14, fluid delivery to the plurality of job sites 1400A, 1400B, 1400C may be monitored from a central command center 1408. Specifically, each CCU 1406 may transmit information to the central command center 1408. This information may include, but is not limited to: real time status of the primary valve and the secondary valve associated with each fluid tank 708 such as, for example, whether each valve is shut off or not; warning signals about failure of a primary valve at a particular fluid tank 708; location of the fluid tank 708 where the failure occurred; warning signals about failure of a distribution solenoid valve 728; updates when a failed valve is repaired or replaced; etc. In this manner, the operator at the central command center 1408 can effectively and efficiently monitor one or more job sites 1400A, 1400B, 1400C to detect and address any failures of the valves to safely and remotely regulate fluid flow into the fluid tanks 708 of the fluid consuming assets 710.

Accordingly, as would be appreciated by those of ordinary skill in the art having the benefit of the present disclosure, the methods and systems disclosed herein provide flexibility to an operator on how to handle the failure of the primary valve depending on the particular implementation at a given site or other operator preferences. For instance, by providing a secondary valve that can automatically take over regulating fluid flow to a fluid tank when the primary valve fails, the methods and systems disclosed herein facilitate a safer and easier way for delivering fluid to a fluid consuming asset. Moreover, in certain embodiments, by providing a tertiary valve the methods and systems disclosed herein provide yet another layer of redundancy and minimize the risks of overfilling any fluid tanks and spills. Additionally, by configuring a system that can be monitored remotely the methods and systems disclosed herein reduce the manpower needed to implement a job at a given job site. Moreover, fluid delivery is often desired in remote areas which may require exposure to harsh work and/or weather conditions. By substantially eliminating the need for personnel onsite to monitor the fluid tanks to avoid overfills and spills the methods and systems disclosed herein substantially reduce the need for personnel to be exposed to such conditions.

Further, as would be appreciated by those of ordinary skill in the art, having the benefit of the present disclosure, by providing a central interface that allows an operator to monitor fluid delivery at an entire job site (or if desired, multiple job sites) the methods and systems disclosed herein substantially improve the efficiency and safety with which fluids are delivered to fluid consuming assets.

The methods and systems disclosed herein may be beneficial in any application where a fluid is delivered to one or more fluid consuming assets. For instance, the methods and systems disclosed herein may be beneficial in instances where one or more fluid consuming assets are located remotely from a fluid source, where the fluid consuming assets are geographically dispersed, and/or where the fluid consuming assets are exposed to harsh weather conditions. In one illustrative application for example, the methods and systems disclosed herein may be used to deliver fuel to a fuel consuming asset. For instance, the fuel consuming assets may be one or more pieces of machinery (e.g., pumps, blenders, etc.). In one illustrative application, the methods and systems disclosed herein may be used to deliver fuel from a storage tank to one or more fuel consuming assets which comprise the equipment used to perform a fracturing operation on a subterranean formation. While illustrative applications of the methods and systems disclosed herein are recited, as would be appreciated by those of ordinary skill in the art, having the benefit of the present disclosure, the methods and systems disclosed herein may be used in any application where it is desirable to deliver fluid to one or more fluid consuming assets.

As would be appreciated, numerous other various combinations of the features discussed above can be employed without departing from the scope of the present disclosure. While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope. Accordingly, all changes and modifications that come within the spirit of the disclosure are to be considered within the scope of the disclosure.

The invention claimed is:

1. A system for delivering a fluid to a fluid consuming asset having a fluid tank comprising:
   a manifold having an inlet and one or more outlets,
      wherein the inlet of the manifold is fluidically coupled to a storage tank and is operable to allow fluid flow from the storage tank into the manifold;
   a fluid transporting mechanism having a first distal end fluidically coupled to an outlet of the manifold and a second distal end fluidically coupled to a mechanical valve disposed within the fluid tank,
      wherein the fluid transporting mechanism is operable to deliver fluid from the manifold to the fluid tank;
   an electric valve fluidically coupled to the fluid transporting mechanism between the first distal end and the second distal end,
      wherein the electric valve is operable to shut off fluid flow through the fluid transporting mechanism to the fluid tank;
   an electric probe disposed inside the fluid tank, the electric probe comprising a seat, a contact, and a float disposed between the seat and the contact,
      wherein the float is movable between a first position where the float rests on the seat and a second position where the float connects to the contact;
   a probe control line communicatively coupling the electric probe and the electric valve,
      wherein when the float is in the second position the probe control line communicates a signal from the electric probe to the electric valve, and
      wherein the electric valve is operable to shut off when it receives the signal.

2. The system of claim 1,
   wherein the mechanical valve is operable to restrict fluid flow into the fluid tank when the level of fluid in the fluid tank reaches a first fluid level threshold,
   wherein the signal is communicated from the electric probe to the electric valve when the level of fluid in the fluid tank reaches a second fluid level threshold, and
   wherein the first fluid level threshold is lower than the second fluid level threshold.

3. The system of claim 2, wherein the electric valve is a solenoid valve.

4. The system of claim 1, wherein the electric valve is disposed outside the fluid tank.

5. The system of claim 1, further comprising a notification mechanism, wherein the notification mechanism generates a notification when the electric valve shuts off.

6. The system of claim 5, wherein the notification generated by the notification mechanism is selected from a group consisting of a visual notification, an audio notification, and an audio-visual notification.

7. The system of claim 1, further comprising:
   a control box,
      wherein a portion of the fluid transporting mechanism is disposed in the control box;
      wherein the electric valve is fluidically coupled to the portion of the fluid transporting mechanism disposed in the control box;
   a solenoid control line extending from the control box,
      wherein the solenoid control line is communicatively coupled to the electric valve;
      wherein the probe control line communicatively couples the electric probe to the electric valve through the solenoid control line; and
   a power source,
      wherein the power source supplies power to the electric valve.

8. The system of claim 1, wherein the fluid comprises a fuel and the fluid consuming asset comprises a fuel consuming asset.

9. A method of delivering fluid from a storage tank to a fluid consuming asset comprising:
   directing the fluid from the storage tank to an inlet of a manifold, the manifold having a plurality of outlets;
   directing the fluid from an outlet of the manifold to a fluid transporting mechanism,
      wherein the fluid transporting mechanism is fluidically coupled to an electric valve;
   directing the fluid from the fluid transporting mechanism to a mechanical valve disposed inside the fluid tank,
   shutting off the mechanical valve when level of fluid in the fluid tank reaches a first fluid level threshold;
   shutting off the electric valve when level of fluid in the fluid tank reaches a second fluid level threshold,
      wherein the first fluid level threshold is lower than the second fluid level threshold.

10. The method of claim 9, wherein shutting off the electric valve when level of fluid in the fluid tank reaches a second fluid level threshold comprises:
    disposing an electric probe in the fluid tank, the electric probe comprising a seat, a contact and a float disposed between the seat and the contact;
    moving the float from the seat to the contact when fluid level in the fluid tank reaches the second fluid level threshold;
    transmitting a signal from the electric probe to the electric valve once the float connects to the contact; and shutting off the electric valve in response to the signal received from the electric probe.

11. The method of claim 10, further comprising generating a warning when the electric valve shuts off to indicate that the mechanical valve failed.

12. The method of claim 9, further comprising disposing the electric valve outside the fluid tank.

* * * * *